United States Patent
Zitouni et al.

(10) Patent No.: US 11,880,761 B2
(45) Date of Patent: Jan. 23, 2024

(54) DOMAIN ADDITION SYSTEMS AND METHODS FOR A LANGUAGE UNDERSTANDING SYSTEM

(71) Applicant: Microsoft Technology Licensing, LLC, Redmond, WA (US)

(72) Inventors: Imed Zitouni, Bellevue, WA (US); Dongchan Kim, Seattle, WA (US); Young-Bum Kim, Fairview, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1260 days.

(21) Appl. No.: 15/662,927

(22) Filed: Jul. 28, 2017

(65) Prior Publication Data

US 2019/0034795 A1    Jan. 31, 2019

(51) Int. Cl.
| | |
|---|---|
| *G06N 3/08* | (2023.01) |
| *G06N 5/02* | (2023.01) |
| *G06N 5/043* | (2023.01) |
| *G06F 40/30* | (2020.01) |
| *G06F 40/35* | (2020.01) |

(Continued)

(52) U.S. Cl.
CPC ......... *G06N 3/08* (2013.01); *G06F 16/90335* (2019.01); *G06F 40/30* (2020.01); *G06F 40/35* (2020.01); *G06N 3/044* (2023.01); *G06N 5/027* (2013.01); *G06N 5/043* (2013.01); *G06N 7/01* (2023.01); *G10L 15/063* (2013.01);

(Continued)

(58) Field of Classification Search
CPC ........ G06N 3/08; G06N 3/0445; G06N 5/027; G06N 5/043; G06N 7/005; G10L 15/063; G10L 15/1815; G10L 15/22; G10L 2015/223; G06F 16/90335; G06F 40/35; G06F 40/30

See application file for complete search history.

(56) References Cited

U.S. PATENT DOCUMENTS

| | | | |
|---|---|---|---|
| 8,015,006 B2 * | 9/2011 | Kennewick | ......... G10L 15/1822 |
| | | | 704/236 |
| 9,292,492 B2 | 3/2016 | Sarikaya et al. | |

(Continued)

FOREIGN PATENT DOCUMENTS

| | | | |
|---|---|---|---|
| CN | 106796603 A | 5/2017 | |
| WO | 2017007742 A1 | 1/2017 | |
| WO | WO-2017007742 A1 * | 1/2017 | ............. G06N 20/00 |

OTHER PUBLICATIONS

Liu et al., "Deep Contextual Language Understanding in Spoken Dialogue Systems," in Sixteenth Ann. Conf. Int'l Speech Comm. Ass'n (2015). (Year: 2015).*

(Continued)

*Primary Examiner* — Ryan C Vaughn
(74) *Attorney, Agent, or Firm* — SHOOK, HARDY & BACON L.L.P.

(57) ABSTRACT

Systems and methods for adding a new domain to a natural language understanding system to form an updated language understanding system with multiple domain experts are provided. More specifically, the systems and methods are able to add a new domain utilizing data from one or more of the domains already present in the natural language understanding system while keeping the new domain and the already present domains separate from each other.

20 Claims, 15 Drawing Sheets

(51) Int. Cl.
  G06F 16/903 (2019.01)
  G10L 15/06 (2013.01)
  G10L 15/18 (2013.01)
  G10L 15/22 (2006.01)
  G06N 3/044 (2023.01)
  G06N 7/01 (2023.01)
(52) U.S. Cl.
  CPC .......... *G10L 15/1815* (2013.01); *G10L 15/22* (2013.01); *G10L 2015/223* (2013.01)

(56) References Cited

U.S. PATENT DOCUMENTS

| | | | |
|---|---|---|---|
| 9,311,298 | B2 | 4/2016 | Sarikaya et al. |
| 10,692,006 | B1* | 6/2020 | Zhang .................... G06N 20/00 |
| 2014/0379326 | A1* | 12/2014 | Sarikaya ................ G10L 15/18 704/9 |
| 2015/0149176 | A1 | 5/2015 | Giulianelli et al. |
| 2015/0179168 | A1 | 6/2015 | Hakkani-Tur et al. |
| 2018/0225278 | A1* | 8/2018 | Alba ....................... G06F 40/30 |

OTHER PUBLICATIONS

Dredze et al., "Online Methods for Multi-Domain Learning and Adaptation," in Proc. Conf. on Empirical Methods in Natural Language Processing 689-97 (2008). (Year: 2008).*

Kundu, "Domain Adaptation with Minimal Training," doctoral dissertation, U. Ill. Urbana-Champlain (2014). (Year: 2014).*

Erfani et al., "Robust Domain Generalisation by Enforcing Distribution Invariance," in Proc. Twenty-Fifth Int'l Joint Conf. Artificial Intelligence 1455-61 (2016). (Year: 2016).*

Kim, et al., "Domain Attention with an Ensemble of Experts", In Proceedings of In Annual Meeting of the Association for Computational Linguistics, Jul. 28, 2017, pp. 643-653.

"International Search Report and Written Opinion Issued in PCT Application No. PCT/US2018/034969", dated Sep. 18, 2018, 13 Pages.

Margolis, et al., "Domain adaptation with unlabeled data for dialog act tagging", In Proceedings of the Workshop on Domain Adaptation for Natural Language Processing, Jul. 15, 2010, pp. 45-52.

Pan, Sinno Jialin, "Transfer Learning", In Publication of Chapman and Hall/CRC, Jul. 25, 2014, pp. 1-35.

Guo, et al., "Joint Semantic Utterance Classification And Slot Filling With Recursive Neural Networks", In Proceedings of IEEE Spoken Language Technology Workshop, Dec. 7, 2014, pp. 554-559.

Yoshida, et al., "Transfer learning for multiple-domain sentiment analysis—identifying domain dependent/independent word polarity", In Proceedings of the Twenty-Fifth AAAI Conference on Artificial Intelligence, Aug. 7, 2011, pp. 1286-1291.

Hakkani-Tur, et al., "A Weakly-Supervised Approach for Discovering New User Intents from Search Query Logs", In Proceedings of Annual Conference of the International Speech Communication Association, Aug. 25, 2013, pp. 3780-3784.

Blitzer, et al., "Biographies, bollywood, boom-boxes and blenders: Domain adaptation for sentiment classification", In Proceedings of the 45th Annual Meeting of the Association of Computational Linguistics, Jun. 23, 2007, pp. 440-447.

Blitzer, et al., "Domain adaptation with structural correspondence learning", In Proceedings of the conference on empirical methods in natural language processing, Jul. 22, 2006, pp. 120-128.

Daume III, Hal, "Frustratingly easy domain adaptation", In Journal of the Computing Research Repository, Jul. 2009, 9 pages.

Daume, et al., "Domain adaptation for statistical classifiers", In Journal of Artificial Intelligence Research, vol. 26, Issue 1, May 2006, pp. 101-126.

Graves, Alex, "Supervised Sequence Labelling with Recurrent Neural Networks", In Publication of Springer, 2012, 55 pages.

Hakkani-Tur, et al., "Multi-domain joint semantic frame parsing using bi-directional RNN-LSTM", In Proceedings of the 17th Annual Meeting of the International Speech Communication Association, Jun. 24, 2016, 5 pages.

Hochreiter, et al., "Long short-term memory", In Journal of Neural computation, vol. 9, Issue 8, Nov. 15, 1997, pp. 1735-1780.

Jaech, et al., "Domain adaptation of recurrent neural networks for natural language understanding", In Journal of the Computing Research Repository, Apr. 2016, 5 pages.

Kim, et al., "Frustratingly easy neural domain adaptation", In Proceedings of the 26th International Conference on Computational Linguistics, Dec. 11, 2016, pp. 387-396.

Kim, et al., "New Transfer Learning Techniques for Disparate Label Sets", In Proceedings of 53rd Annual Meeting of the Association for Computational Linguistics and the 7th International Joint Conference on Natural Language Processing, Jul. 26, 2015, pp. 473-486.

Kingma, et al., "Adam: A method for stochastic optimization", In Proceedings of the International Conference on Learning Representations, May 7, 2015, pp. 1-15.

Lample, et al., "Neural architectures for named entity recognition", In Journal of the Computing Research Repository, Mar. 2016, 11 pages.

Neubig, et al., "Dynet: The dynamic neural network toolkit", In Journal of the Computing Research Repository, Jan. 2017, pp. 1-33.

Pan, et al., "Domain adaptation via transfer component analysis", In Journal of IEEE Transactions on Neural Networks, vol. 22, Issue 2, Feb. 2011, pp. 199-210.

Schuster, et al., "Bidirectional recurrent neural networks", In Journal of IEEE Transactions on Signal Processing, vol. 45, Issue 11, Nov. 1997, pp. 2673-2681.

Srivastava, et al., "Dropout: a simple way to prevent neural networks from overfitting", In Journal of Machine Learning Research, vol. 15, Issue 1, Jan. 2014, pp. 1929-1958.

"Office Action Issued in Indian Patent Application No. 202047004751", dated Mar. 7, 2022, 7 Pages.

"Summons to Attend Oral Proceedings Issued in European Patent Application No. 18733058.4", Mailed Date: Oct. 8, 2021, 6 Pages.

"Office Action issued in Chinese Patent Application No. 201880047864.5", dated Apr. 3, 2023, 8 Pages.

"Notice of Allowance Issued in Chinese Patent Application No. 201880047864.5", dated Nov. 30, 2023, 4 Pages.

* cited by examiner

DOMAIN ADDITION SYSTEMS AND METHODS FOR A LANGUAGE UNDERSTANDING SYSTEM

BACKGROUND

Machine learning, language understanding, and artificial intelligence are changing the way users interact with computers. Developers of computers and applications are always trying to improve the interactions between humans and computers. However, development of language understanding models often requires a significant amount of time, money, and other resources to accomplish.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for adding a new domain to a natural language understanding system to form an updated language understanding system with multiple domain experts. Further, the disclosure generally relates to systems and methods for using the updated language understanding system. More specifically, the systems and methods disclosed herein are able to add a new domain utilizing data from one or more of the domains already present in the natural language understanding system while keeping the new domain and the already present domains separate from each other. Accordingly, the systems and methods disclosed herein provide for a more accurate natural language understanding system, a more reliable natural language understanding system, and a more efficient natural language understanding system. Further, the systems and methods described herein provide natural language understanding systems with better development (including update ability), intelligence, productivity, and scalability.

One aspect of the disclosure is directed to a natural language understanding (NLU) system. The NLU system includes domain experts, at least one processor, and memory. Each domain expert includes at least one of an intent classification task or a slot tagging task. The memory encodes computer executable instructions that, when executed by the at least one processor, perform a method. The method includes:
 receiving a new domain for the NLU system;
 receiving limited training data for the new domain;
 training the new domain based on the limited training data to form a partially trained new domain;
 sending queries to the domain experts based on the limited training data.
 receiving answers from each domain expert in response to the queries;
 assigning a weight to each of the answers from the domain experts to form weighted answers; and
 training the partially trained new domain based the weighted answers to form a new domain expert.

Another aspect of the disclosure includes a method for adding a new domain to a NLU system. The method includes:
 receiving the new domain for the NLU system;
 receiving training data for the new domain;
 training the new domain based on the training data to form a partially trained new domain;
 sending a first query to domain experts on the NLU system based on the new domain;
 receiving answers from each domain expert in response to the first query;
 assigning a weight to each of the answers utilizing the partially trained new domain to form weighted answers;
 training the partially trained new domain based the weighted answers to form a new domain expert;
 receiving a user utterance for the new domain expert;
 determining an action based on the user utterance with the new domain expert; and
 sending instructions to perform the action.

Yet another aspect of the disclosure includes a system. The system includes at least one processor and memory. The memory encodes computer executable instructions that, when executed by the at least one processor, cause the at least one processor to perform a method for natural language understanding (NLU). The method includes:
 receiving a new domain for a NLU system;
 receiving training data for the new domain;
 training the new domain based on the training data to form a partially trained new domain;
 sending queries to domain experts already present in the NLU system;
 receiving answers from each domain expert in response to the queries;
 assigning a weight to each of the answers from the domain experts;
 selecting a portion of the answers for training based on the weight assigned to each of the answers to form a group of selected answers; and
 training the partially trained new domain based the group of selected answers to form a new domain expert.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples or aspects are described with reference to the following Figures.

DETAILED DESCRIPTION

Figure 1A:
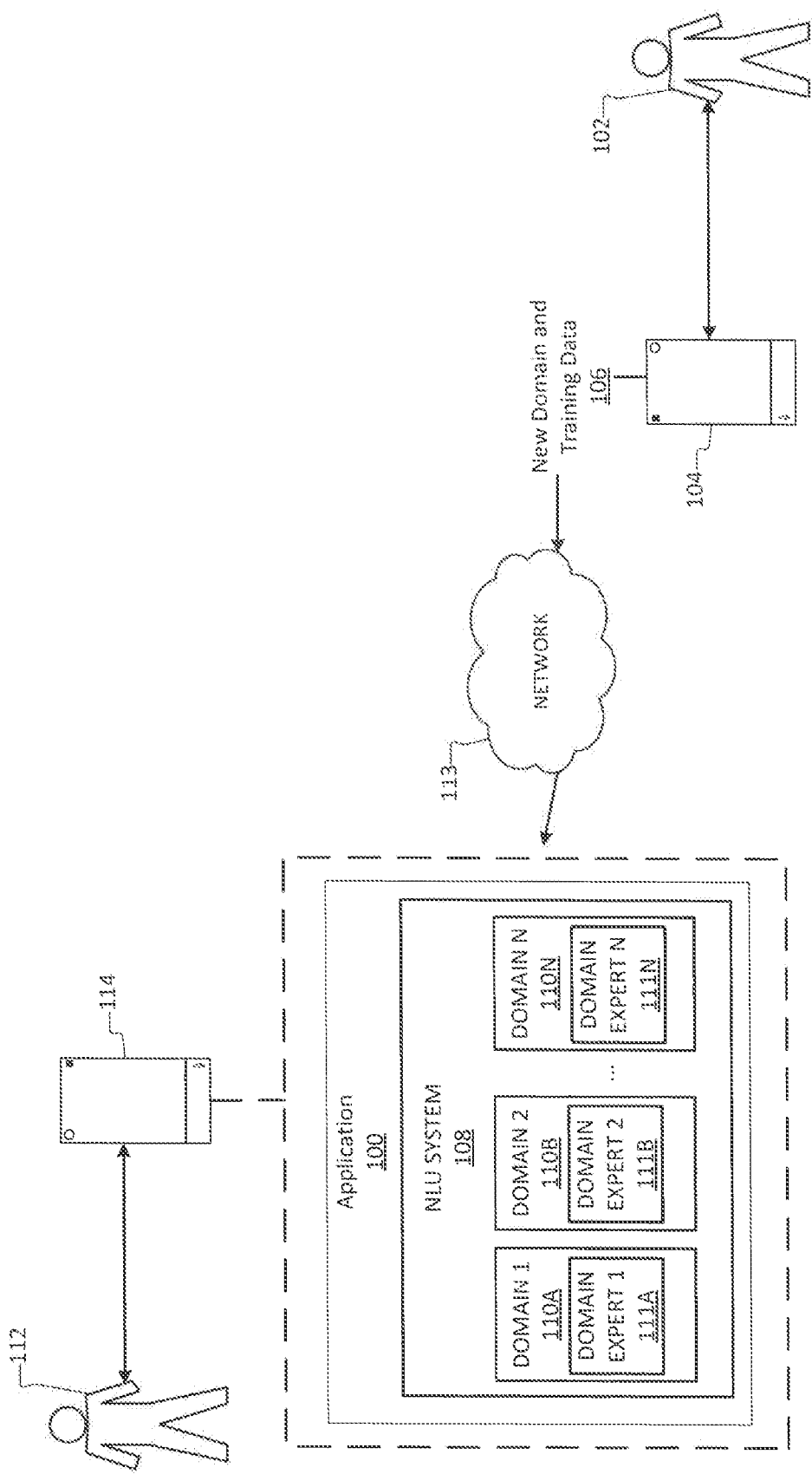
FIG. 1A is a schematic diagram illustrating an application with a natural language understanding system being utilized by a user via a client computing device, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Progress in machine learning, language understanding and artificial intelligence are changing the way users interact with computers. Digital assistant applications, such as SIRI®, GOOGLE NOW® and CORTANA® are examples of the shift in human computer interaction. A natural language understanding (NLU) system is responsible to extract semantic frames to represent the natural language input's domain, intents, and semantic slots (or entities). The NLU system utilizes NLU models that are usually trained from domain specific inputs or utterances (also referred to herein as queries) with semantic annotation. NLU systems are often utilized to perform tasks, such as booking a restaurant, arranging travel, adding appointments to a calendar, simple chit-chat, etc. One component for the success of a digital assistant utilizing a NLU system is to recognize the intent and tag the slots in an input query. This interaction is natural language oriented because speech and text inputs usually predominant.

One challenge engineers face when building digital assistant applications is how to build robust intent detection and slot tagging modules (or NLU systems). Another challenge engineers face is related to domain adaptation: how quickly a NLU system can generalize to a new domain with limited supervision given the number of existing domains (K). Currently, when adding a new domain, the NLU system is retrained in a global model across all K+1 domains using standard techniques. In other words, currently, the NLU system has to re-estimate a global model from scratch each time a new domain with potentially new intents and slots is added to the NLU system.

For instance, if an ORDERPIZZA domain is added to a NLU system where a domain specific intent and semantic slot tagger is desired with a limited amount of training data, training only on the target domain fails to utilize the existing resources in other domains that are relevant (e.g., labeled data for PLACES domain with place name, location as the slot types). Further, training on the union of all domains does not work well since different domains can have widely varying distributions (training data and tasks differences).

There is typically no system or method that allows a domain with limited training data to be added to a NLU system that can utilize the existing resources in other relevant domains without having to utilize a union of all resources in all of the known domains. The systems and method disclosed herein provide for a NLU system with an ensemble of domain experts that utilizes domain attention in the addition of a new domain with limited training data (also referred to herein as use of a domain expert training model). The systems and method as disclosed herein provide a balance by utilizing all known data, but simultaneously distinguishing by domain types. Accordingly, the systems and method disclosed herein improve the accuracy of the NLU system and decrease the amount of training time necessary to add a new domain when compared to previously utilized NLU systems that are retrained utilizing a new global model from scratch after the addition of the new domain. Therefore, the systems and methods disclosed herein provide for a more accurate NLU system, a more reliable NLU system, and a more efficient NLU system when compared to previously utilized NLU systems. Further, the systems and methods described herein provide natural language understanding systems with better development (including update ability), productivity, intelligence, and scalability when compared to previously utilized NLU systems that utilize a global model to update new domains.

FIGS. 1A-1D illustrate different examples of an application 100 including a natural language understanding (NLU) system 108 being utilized by a user 112 via a client computing device 114, in accordance with aspects of the disclosure. Further, FIGS. 1A-1D illustrate that the NLU system 108 of the application can be updated via a creator computing device 104 being utilized by a developer 102 of the application 100, in accordance with aspects of the disclosure. Accordingly, the NLU system 108 and the application 100 communicate between each other. In further aspects, the application 100 also communicates with client computing device 114 and/or the creator computing device 104.

Figure 1B:
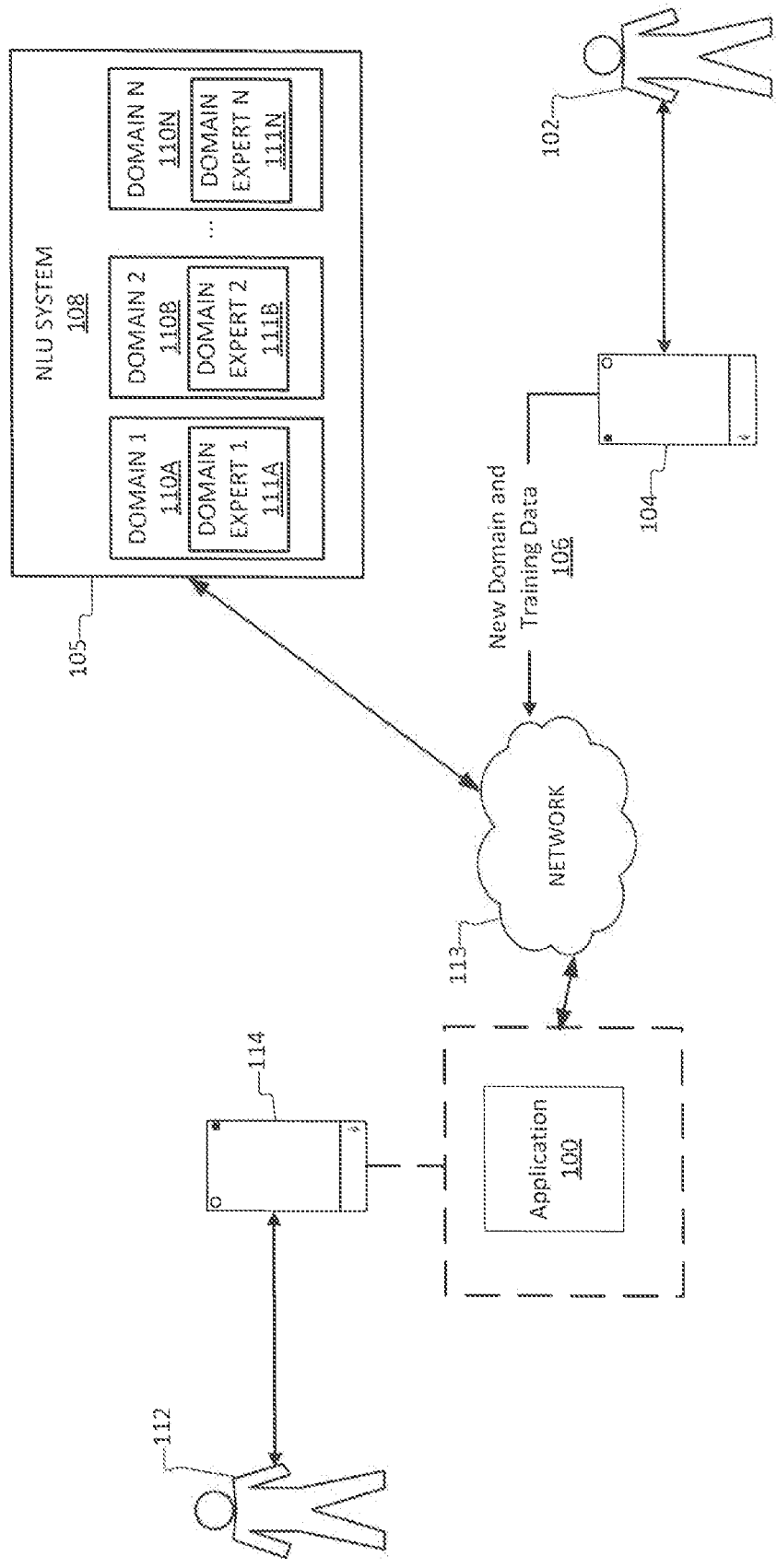
FIG. 1B is a schematic diagram illustrating an application with a natural language understanding system being utilized by a user via a client computing device, in accordance with aspects of the disclosure.

In some aspects, the application 100 is implemented on the client computing device 114 as illustrated by FIGS. 1A and 1B. In a basic configuration, the client computing device 114 or the creator computing device 104 is a computer having both input elements and output elements. The client computing device 114 may be any suitable computing device for implementing the application 100. The creator computing device 104 may be any suitable computing device for sending new domains, training data, and other updates to application 100. For example, the client computing device 114 and/or the creator computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 114 for implementing the application 100 or for running a NLU system 108 as provided by application 100 may be utilized. Any suitable creator computing device 104 for sending updates to the application 100 or the NLU system 108 running on the application 100 may be utilized.

Figure 1C:
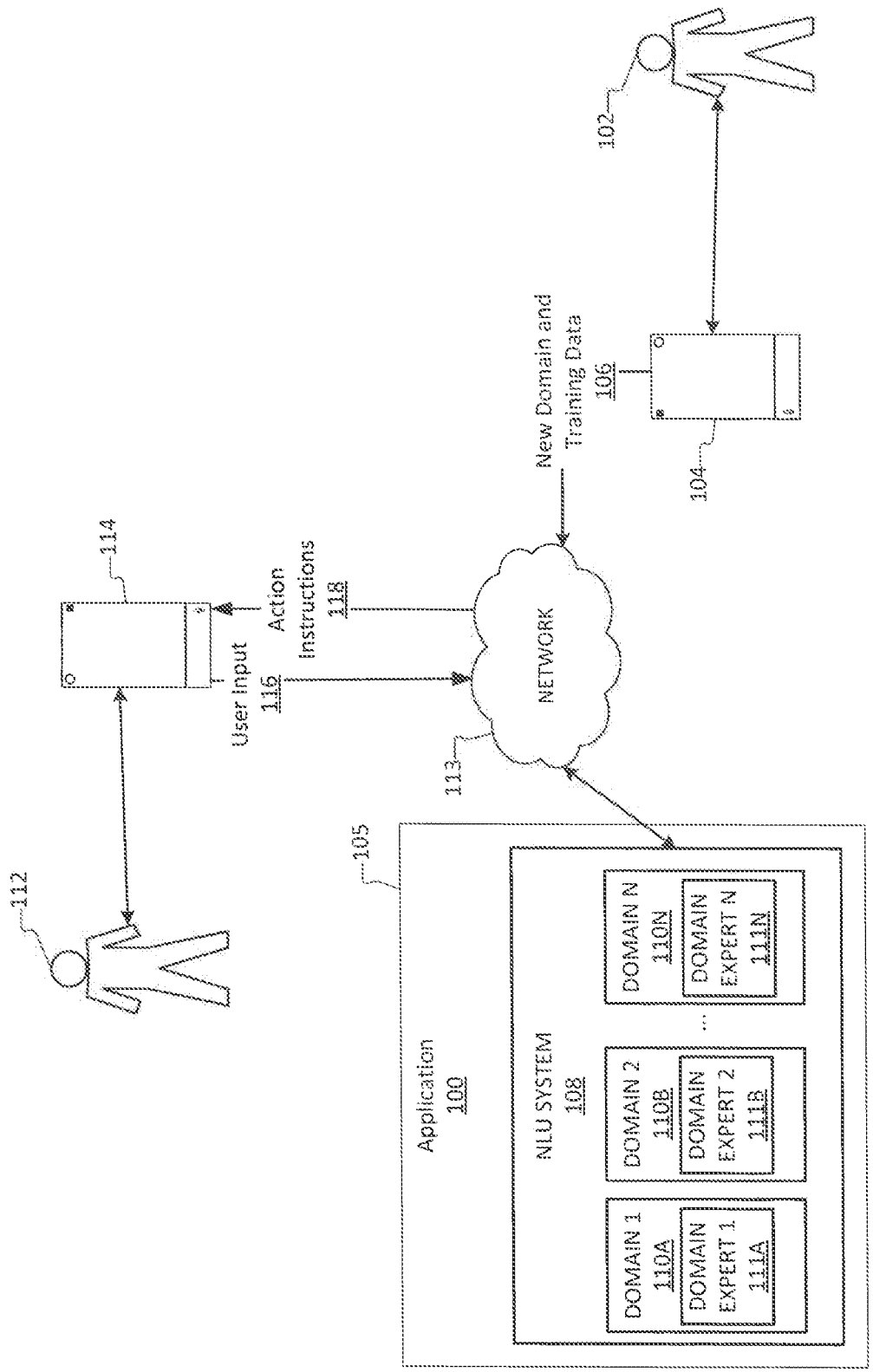
FIG. 1C is a schematic diagram illustrating an application with a natural language understanding system being utilized by a user via a client computing device, in accordance with aspects of the disclosure.
Figure 1D:
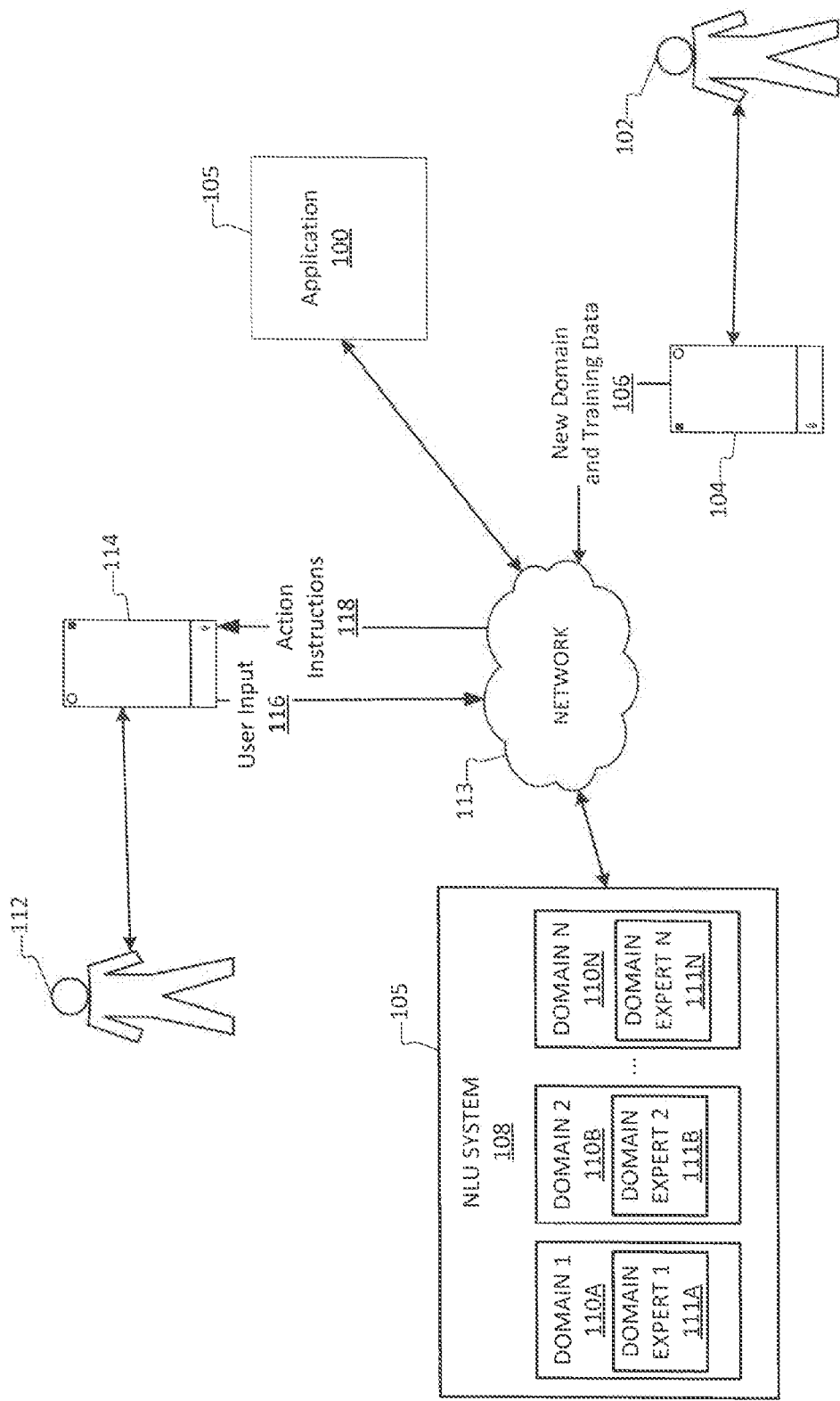
FIG. 1D is a schematic diagram illustrating an application with a natural language understanding system being utilized by a user via a client computing device, in accordance with aspects of the disclosure.

In other aspects, the application 100 is implemented on a server computing device 105, as illustrated in FIGS. 1C and 1D. The server computing device 105 may provide data to and/or receive data from the client computing device 114 and/or the creator computing device 104 through a network 113. In some aspects, the network 113 is a distributed computing network, such as the internet. In further aspects, that application 100 is implemented on more than one server computing device 105, such as a plurality or network of server computing devices 105 as illustrated in FIG. 1C. For example, the NLU system 108 may be located on the same server 105 as the application 100 as illustrated in FIG. 1B or may be located on separate servers 105 as illustrated in FIG. 1D. In some aspects, the application 100 is a hybrid system with portions of the application 100 on the client computing device 114 and with portions of the application 100 on one or more server computing devices 105, such as the NLU system 108 as illustrated in FIG. 1B.

The application 100 may be any type of application 100 utilized by the client computing device 114. For example, the application 100 may be a digital assistant application. In other examples, the application 100 can be a voice recognition application, an email application, a social networking application, a collaboration application, an enterprise management application, a messaging application, a word processing application, a spreadsheet application, a database application, a presentation application, a digit assistant application, a contacts application, a gaming application, an e-commerce application, an e-business application, a transactional application, exchange application, a calendaring application, and/or etc.

As discussed above, the application 100 includes a NLU system 108. The NLU system 108 is designed to classify (also referred to as labeling or tagging herein) and decode a wide variety of different natural language inputs 116 or utterances, from a client computing device 114. The inputs 116 or utterances may be any sequence of natural language data that need to be clustered or classified and decoded, such as queries, search queries, commands, etc.

The NLU system 108 includes one or more different domains 110A, 110B . . . 110N. As utilized herein, a domain 110 refers to a set of tasks grouped together to accomplish a set task or goal, such as ordering pizza, booking a flight, making a reservation, etc. Depending upon the type of application 100, any number of different domains 110 may be needed. For example, a travel application may want to include a "book flight" domain, a "book hotel" domain, a "book transportation" domain, a "calendaring domain", and/or a "weather domain". For example, a digital assistant application may need to include all of the above domains listed in the previous example plus numerous others. Further, application developers 102 may want to add new domains 110C (see FIG. 2) to the application 100 he or she created as new services or businesses become available.

Each domain 110 utilizes one or more domain experts 111A, 111B . . . 111N. Each domain expert 111 is a fully trained task specific learning model. The learning model may be a neural network, statistical model, and/or any other adaptive learning system. Each domain may perform one or more tasks, such as an intent classification task and a slot tagging task. As utilized herein, the intent classification task reviews received utterances or inputs and predicts one or more goals or purposes for the utterance or input. For example, if the received input recites, "Book a flight to MIA this Friday morning and add it to my calendar." The intent classification task is able to determine or predict that the input has two different intents, such as book a flight to MIA and add the flight to the user's calendar. As utilized herein, the slot tagging task determines or predicts the details necessary to fulfill a determined intent. In other words, the slot tagging task determines or predicts all of the words necessary to perform a request. For the example input above, the slot tagging task may identify that the following slots are needed for the "booking a flight" intent: "passenger's name," "start location," "destination location," "date of flight," "time of flight," and/or etc.

The domain experts 111 are able to identify intents and/or slots because each expert has been trained utilizing labeled data or label embeddings. The labels provide the meanings of different words or phrases. For example, the word, "STARBUCKS-" may be labeled as a coffee shop and the phrase, "SEATTLE SEAHAWKS®" may be labeled as a NFL football team. In some aspects, several different labels are provided per word and/or phrase.

Since the NLU system 108 utilizes multiple domain experts, the NLU system 108 is able to identify multiple intents in a single input or utterance and is able to respond to both intents unlike previously utilized NLU systems that utilized a global model. Further, because the NLU system 108 utilizes multiple domain experts, the label space between two or more of the domains experts may differ without issue.

The application 100 receives a user input 116 from the client computing device 114. The NLU system 108 of the application 100 receives the input and determines one or more user intents and identifies any provided slots in the user input 116. The NLU system 108 is also able to identify if any slots are missing from the user input 116. If any missing slots are determined, the NLU system 108 may determine if these missing slots can be found in other accessible data, such as stored user data, information in the dialog history, or accessible world knowledge. If the missing slots are undeterminable, the NLU system 108 may send instructions to the client computing device 114 to request the missing the slots. Once the NLU system 108 on the application 100 receives all of the slots for a determined intent, the NLU system 108 of the application 100 sends or provides instructions 118 to the client computing device 114 to perform an action based on the determined intent. The client computing device 114 performs the action. The action could include calendaring an item, providing a response, booking a flight, and/or etc. This list is not meant to be limiting. The action may be the performance of any determined intent that can be fulfilled by the client computing device 114 and/or any resources accessible to the client computing device 114.

After the application 100 has been launched, the developer 102 may determine that a new domain 110C would be beneficial to the application 100. As such, the developer 104 may send the new domain 110C with training data 106 to the NLU system 108 of the application 100. In some aspects, the training data are limited. A limited amount of training data as utilized herein refers to the use of 10,000 training utterances or inputs or fewer. For example, the limited training data may include 1,000 or even just 100 different training inputs. In other examples, the limited training data may include 50 or fewer different training inputs. In other examples, the limited training data may include 25 or fewer different training inputs. The training data are utterances or inputs with labeled data, identified intents, and/or identified slots. As such, the new domain model 111 C may utilize the provided inputs to train the new domain expert 111 C to identify the correct labels, intents, and/or slots for the provided utterances.

In previously utilized NLU systems, if the NLU system wanted to utilize the existing resources in the already present domains for training the new domain, the NLU system would retrain a global model utilizing the data from all of the domains to form a singular trained global model or global domain expert. This global model would eliminate the existence of the individual models or domain experts. Further, training on the union of all domains does not work well, since different domains can have widely varying distribution (training data and tasks differences). Additionally, each time a new domain is added to the NLU system, these previously utilized NLU systems take longer and longer to train due to the existence of more and more training data that have been run through the model. Alternatively, previously utilized NLU systems could train the new model based solely on the provided training data and not utilize the wealth of knowledge already present on the other domain experts. This process allows each domain to remain separate, but provided domains that were less accurate since each domain was trained with fewer training data.

However, the NLU system 108 as disclosed herein is able to utilize the existing resources in other relevant domains 110 without having to utilize a union of all resources in all of the already present domains 110. The NLU system 108 trains the received new model or new domain expert 111C of the new domain 110C (see FIG. 2) utilizing the received training data 106 to form a partially trained model. Next, the partially trained model or partially trained new domain expert 111C (see FIG. 2) queries each of the domain experts 111A, 111B . . . 111N currently present on the NLU system 108. In some aspects, the query is based on the new domain and/or the received training data. In further aspects, the partially trained domain expert may determine or select the query.

Figure 2:
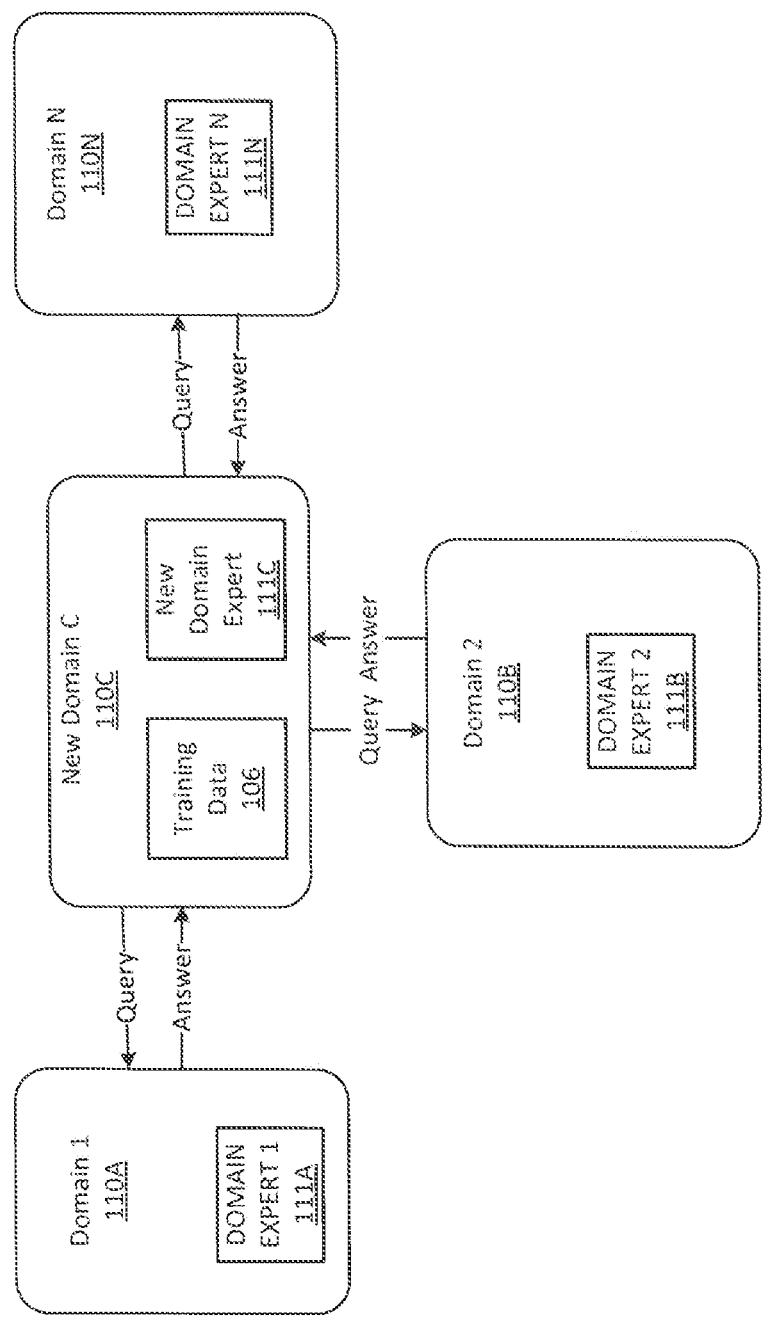
FIG. 2 is a schematic diagram illustrating communication flow between a newly added domain and other already present domains in the natural language understanding system, in accordance with aspects of the disclosure.

FIG. 2 illustrates a schematic diagram of the communication between the new domain 110C and the other already trained domains 110A, 110B . . . 110N. The query may ask each domain expert 111A, 111B . . . 111N for an intent and/or slots for a given input. In further aspects, the query may ask each domain expert 111A, 111B . . . 111N for data labels or label embeddings for different words and/or phrases.

The partially trained domain expert 111C of the new domain 110C receives the requested answers from the domain experts 111A, 111B . . . 111N. The partially trained new domain expert 111C assigns a weight to each received query answer. In some aspects, the partially trained domain expert 111C assigns a weight to each received query answer based on a comparison of an answer to the first query by the partially trained new domain expert 111C to each of the answers provided by the other domain experts 111A, 111B . . . 111N already present on the NLU system 108. In these aspects, the new domain expert 111C may rank answers that are similar higher than other answers that are less similar. In other aspects, the partially trained domain expert 111C assigns a weight to each of the received answers based on a comparison to the training data related to that query. In these aspects, answers that are more similar to the training data may be given a higher weight than answers that are less similar to the training data by the domain expert 111C. In further aspects, the partially trained domain expert 111C assigns a weight to each received answer based on the semantic closeness between the partially trained new domain expert 111C and an already present domain expert 111 on the NLU system 108. Answers from domains with higher semantic closeness to the new domain 111C will receive higher weights than answers from domains with lower semantic closeness to the new domain 110C.

In some aspects, the new domain expert 111C is trained utilizing all of the answers taking into consideration the assigned weights. In other aspects, the new domain expert 111C is trained utilizing only a portion of the answers. The answers selected for training may be the most relevant and/or have a weight that meets a predetermined weight threshold. The new domain expert 111C may send out one or several different queries to each of the domain experts. The new domain expert 111C ranks each of the answers and is trained utilizing all or a portion of these weighted answers. Once the new domain expert 111C has been trained utilizing some or all of the answers received from the domain experts, the new domain expert 111C becomes fully trained and is ready to interpret user inputs or utterances. The domain experts 111 are learning models and therefore continue to learn in response to processing of user inputs as well. During this processing of user inputs, each domain expert may consult the other domain experts utilizing the process discussed above to improve the training of their domain expert. However, the newly added domain 111C will not process any user inputs until the newly added domain has been trained utilizing the received training data 106 and has been trained utilizing weighted answers from other domain experts in response to one or more sent queries by the new domain 110C.

The new domain expert 111C is a learning model. As such, the new domain expert 111C improves or becomes more accurate through additional training at providing weights to received answers from domain experts and/or correctly interpreting received inputs. As such, the domain expert 111C can predict user intent, slots for the intent, and labels for words or phrases in a received user input or utterance utilizing the fully trained new domain expert 111C.

Because the new domain expert 111C is trained or added without retraining a global model that utilizes all of the data from each domain expert, the NLU system 108 as disclosed herein takes significantly less time to train when compared to the previously utilized global model approach for updating domains in NLU system. For example, regardless of the number of domain experts already present on the NLU system 108 (5, 10, 15, 20, or 25 domain experts), the training time for a new model remains relatively constant. For example, the training time for adding a new domain to the NLU system 108 increases by less than 3 minutes if the NLU system has 5 different domain experts or 25 different domain experts. In contrast, previously utilized NLU systems that utilize a global model for adding a new domain increases in training time exponentially for each increase in domain experts. For example, the training time for a global model for adding a new domain with 5 domain experts is around 3 minutes, while the training time for the global model for adding a new domain with 25 domain experts is around 30 minutes. Accordingly, the NLU system 108 decreases the training time for adding new domain while maintaining the separate domains when compared to the previously utilized global model that does not maintain separate domains. Further, the accuracy of the NLU system 108 with separate domain experts is significantly better than the previously utilized global model. Further, the NLU system 108 provides for better development scalability and intelligence, when compared to previously utilized NLU systems. The intelligence comes from the fact that the small amount of training examples needed for new skills can be collected from logs reflecting scenarios where the agent was not performing well at start. This means the NLU system will be covering new scenarios based on user usage and hence getting more intelligent based on contextual usage.

Figure 4:
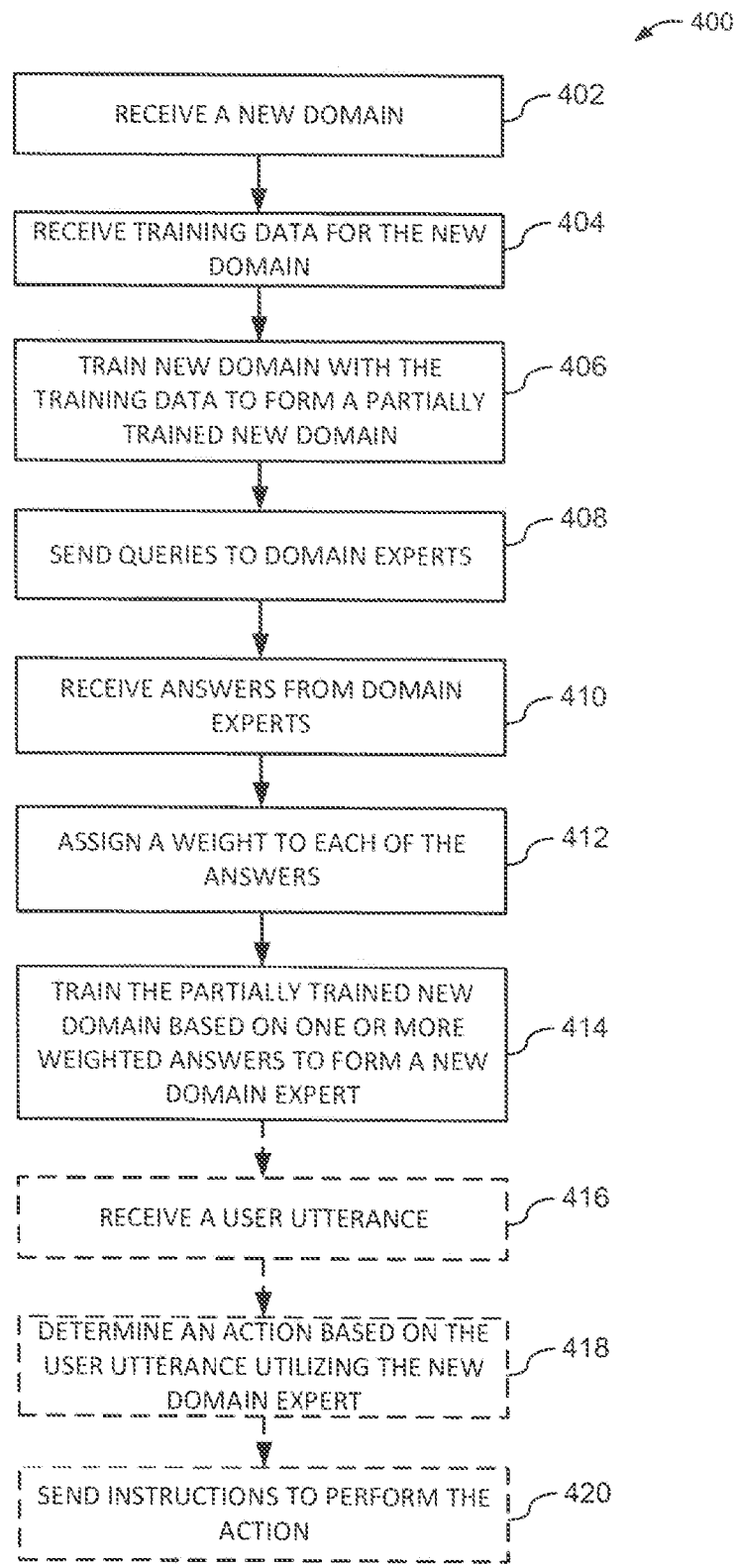
FIG. 4 is a flow diagram illustrating an example of a method for adding a domain to a natural language understanding system and using the formed natural language understanding system.

FIG. 4 is a flow diagram conceptually illustrating an example of a method 400 for adding a new domain to a (NLU) system on an application and utilization of that new domain once added. In some aspects, the NLU system that executes the method 400 adds a new domain to include a plurality of different domain experts, such as 5, 7, 10, 15, 20, 25 or more. Because the NLU system maintains separate domain experts even after a new domain is added during method 400, the NLU system is capable of identifying and responding to multiple intents found in one user input. Further, the label space between at least two of the domain experts on the NLU system may differ.

Method 400 adds a new domain by utilizing existing resources in other relevant domains without having to utilize a union of all resources in of all the known domains. Method 400 provides for a NLU system with an ensemble of domain experts that utilizes domain attention in the addition of a new domain with training data (also referred to herein as a domain expert training model). Method 400 provides a balance by utilizing all know n data, but simultaneously distinguishing by domain types. Accordingly, method 400 improves the accuracy of the NLU system and decreases the amount of training time necessary to add a new domain to an NLU system when compared to previously utilized methods that retain a new global model from scratch utilizing data from all of the domains after the addition of the new domain. Therefore, method 400 provides for a more accurate NLU system, a more reliable NLU system, and a more efficient NLU system when compared to previously utilized methods for adding domains to NLU systems. In some aspects, method 400 is performed by the application 100 and/or NLU system 108 disclosed above.

Method 400 begins with operations 402 and/or 404. Operations 402 and 404 may be performed in any order, simultaneously, or at overlapping times. A new domain is received at operation 402. Training data for the new domain are received at operation 404. In some aspects, the training data include a limited amount of training data. As discussed above, training data are considered limited when the training data include fewer than 10,000, 1,000, or 100 utterances or inputs for training the new domain.

At operation 406, the new domain is trained utilizing the training data to form a partially trained new domain. Next, one or more queries are sent to one or more domain experts on the NLU system at operation 408. In some aspects, the one or more queries request intent prediction, slot prediction, and/or label prediction. In some aspects, the one or more queries are generated by the partially trained new domain. In further aspects, the partially trained new domain generates the queries based on the received training data.

At operations 410 and 412, a weight is assigned to each answer from each of the queried domain experts. In some aspects, the partially trained new domain assigns a weight to each of the received answers at operations 410 and 412. In further aspects, at operations 410 and 412 the weight assigned to each of the answers is based on the semantic closeness of the partially trained new domain and a domain expert that provided the answer. In other aspects, the weight assigned to each of the answers is based on a comparison of an answer to the first query by the partially trained new domain to each of the answers provided by the domain experts.

Next, at operation 414, the partially trained new domain is further trained utilizing one or more of the weighted answers to form a new domain expert. In some aspects, all of the weighted answers are utilized to train the partially trained new domain at operation 414. Alternatively, only answers with weights above a predetermined threshold are utilized to train the partially trained new domain at operation 414. In further aspects, answers with the highest weights for each query are selected and utilized to train the partially trained new domain at operation 414. In some aspects, at operation 414, a portion of the answers are selected for training based on the weight assigned to each of the answers to form a group of selected answers and then the partially trained new domain is trained based the group of selected answers to form a new domain expert. Once the new domain expert has been formed, the NLU system and application are updated and capable of interpreting user inputs related to the new domain.

In some aspects, method 400 includes optional operations 416, 418, and 420 relating to the use of the new domain expert. At operation 416, a user input, such as an utterance, is received. The user input may be determined to be for the new domain expert. Next, at operation 418 an action based on the user utterance is determined utilizing the new domain expert, in some aspects, the new domain expert will further train or update its learning model based on this received user utterance. The action will be determined by the new domain expert by predicting an intent and slots for the utterance and by predicting labels for the words and/or phrases in the utterance. At operation 420, instructions are sent to perform the determined action. The instruction may be sent by the NLU system and/or the application. The instructions are sent or provided to the client computing device for performing the determined actions. The action may be as simple as displaying desired content or as complicated as booking travel plans.

Because method 400 trains the NLU system without retraining a global model that utilizes all of the data from each domain expert, method 400 takes significantly less time to train when compared to the previously utilized methods that utilized a global model approach for updating domains in a NLU system. For example, regardless of the number of domain experts already present on the NLU system 108 (5, 10, 15, 20, or 25 domain experts), the training time for a new model remains relatively constant during method 400. For example, the training time for adding a new domain to the NLU system 108 increases by less than 3 minutes if the NLU system has 5 different domain experts or 25 different domain experts. In contrast, previously utilized NLU systems that utilize a global training model for adding new domains increase in training time exponentially for each increase in domain experts. For example, the training time for a global model for adding a new domain with 5 domain experts is around 3 minutes utilizing method 400, while the training time for the global model for adding a new domain with 25 domain experts is 30 minutes. As such, the training time for adding a new domain does not change by more than 150 seconds regardless of whether the NLU system created by method 400 includes two or 25 different domain experts. Accordingly, method 400 decreases the training time of adding new domain while maintaining the separate domains when compared to the previously utilized global training model that does not maintain separate domains. Further, the accuracy of the NLU system 108 with separate domain experts created by method 400 is significantly better than the previously utilized NLU system created by global training that does not maintain separate domain experts. Further, the method 400 provides for better development scalability and intelligence, when compared to previously utilized methods for adding domains to NLU systems. The intelligence comes from the fact that the small amount of training examples needed for new skills can be collected from logs reflecting scenarios where the agent was not performing well at start. As such, method 400 allows an NLU system to cover new scenarios based on user usage and hence gets more intelligent based on contextual usage.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
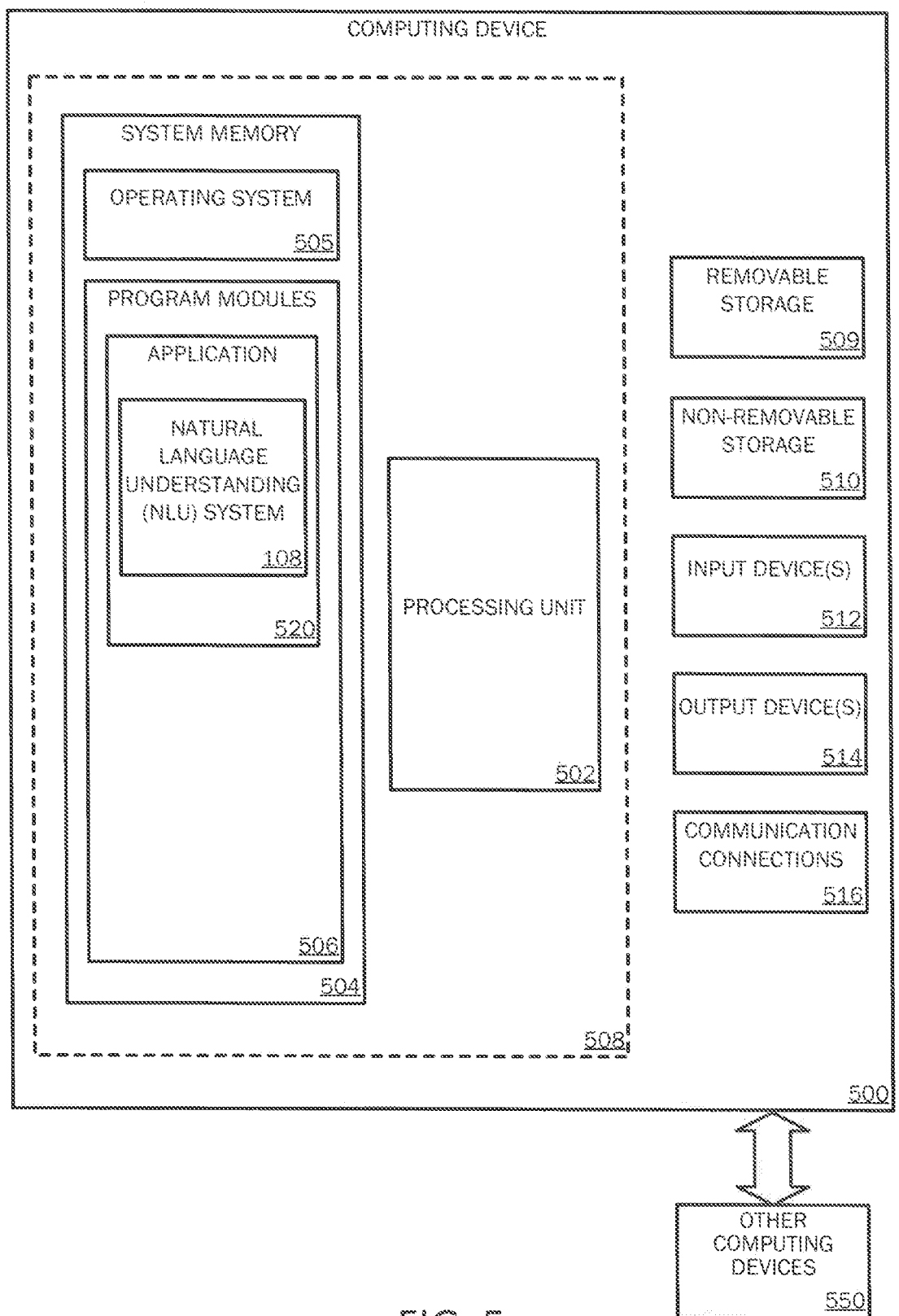
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. For example, a natural language understanding (NLU) system 108 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the NLU system 108 that can be executed to employ the method 400 and implement portions of application 100 or 520 as disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as magnetic disks, optical disks, or tape. Such additional storage is illustrated in FIG. 5 by a removable storage device 509 and a non-removable storage device 510. For example, training features, potential features, input features and/or responses can be stored on any of the illustrated storage devices.

As stated above, a number of program modules and data files may be stored in the system memory 504. While executing on the processing unit 502, the program modules 506 (e.g., the NLU system 108 of application 520) may perform processes including, but not limited to, performing method 400 as described herein. For example, the processing unit 502 may implement the NLU system 108. Applications 520 or program modules 506 that may be used in accordance with aspects of the present disclosure, and in particular that use the NLU system 108, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a calendaring application, etc. In some aspects, the NLU system 108 is utilized by one of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Aspects of the disclosure may also be practiced using other technologies capable of performing logical operations such as AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 55). Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
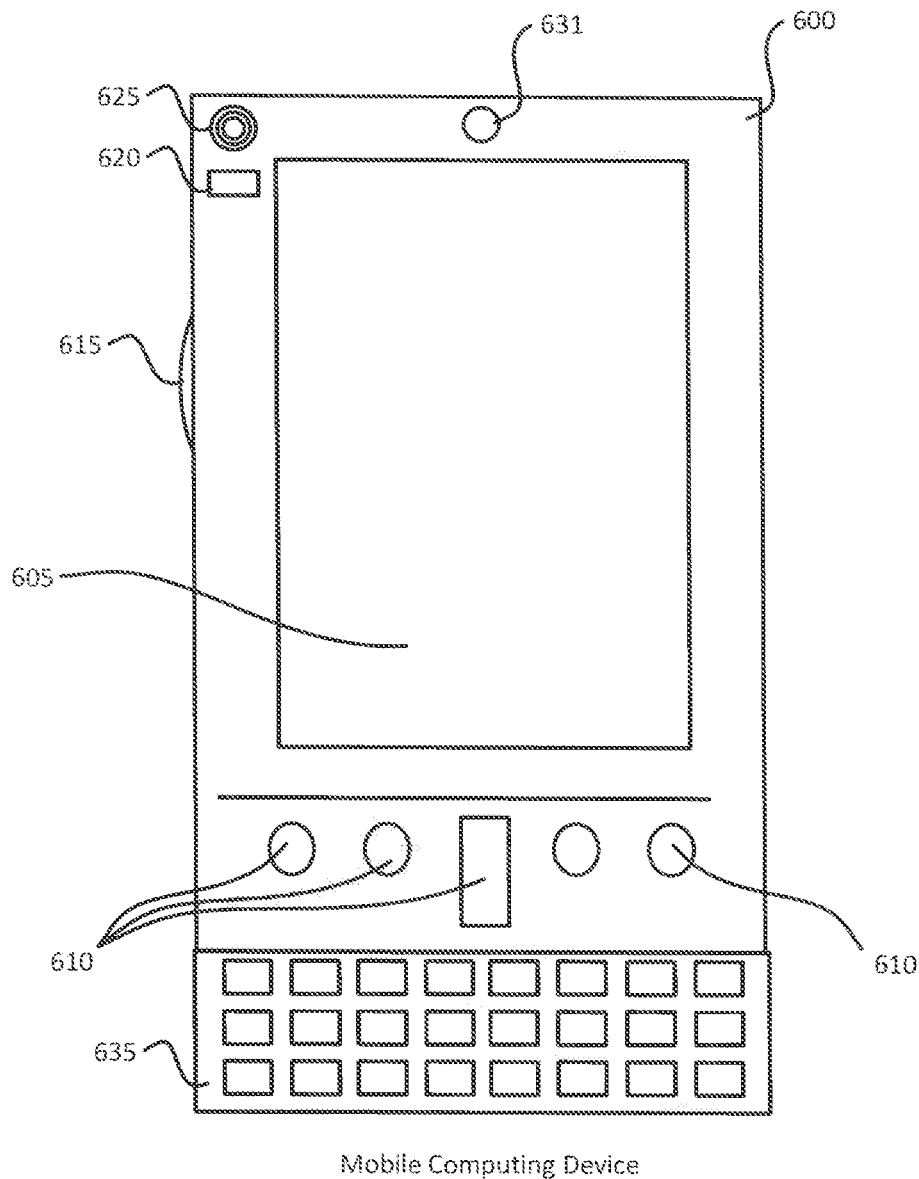
FIGS. 6A and 6B are simplified block diagrams of a mobile computing device with which aspects of the present disclosure may be practiced.
Figure 6B:
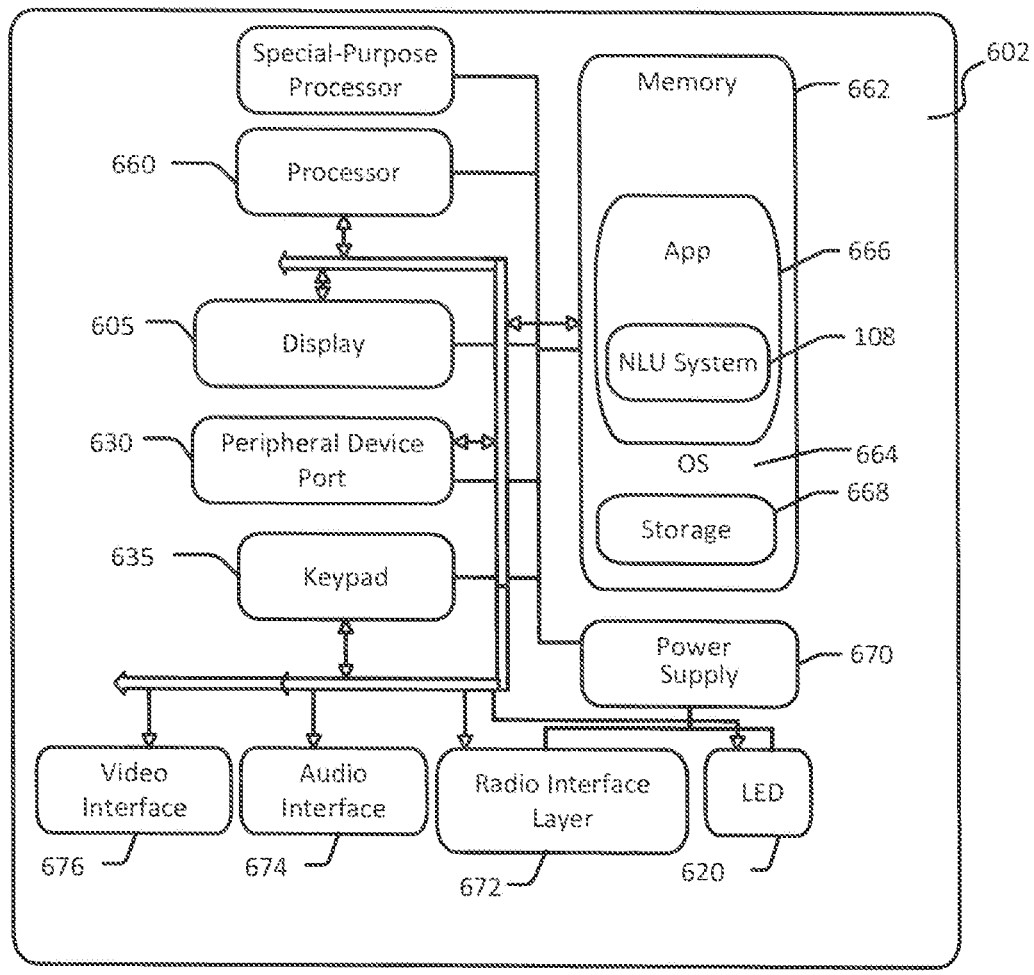

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUT includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision touch, gestures, and machine intelligence.

In various aspects, the output elements include the display 605 for showing a graphical user interface (GUT). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 including a NLU system 108 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world." via a communications carrier or service provider. Transmissions to and from the radio 672 are conducted under control of the operating system 664 in other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 631 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 60 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
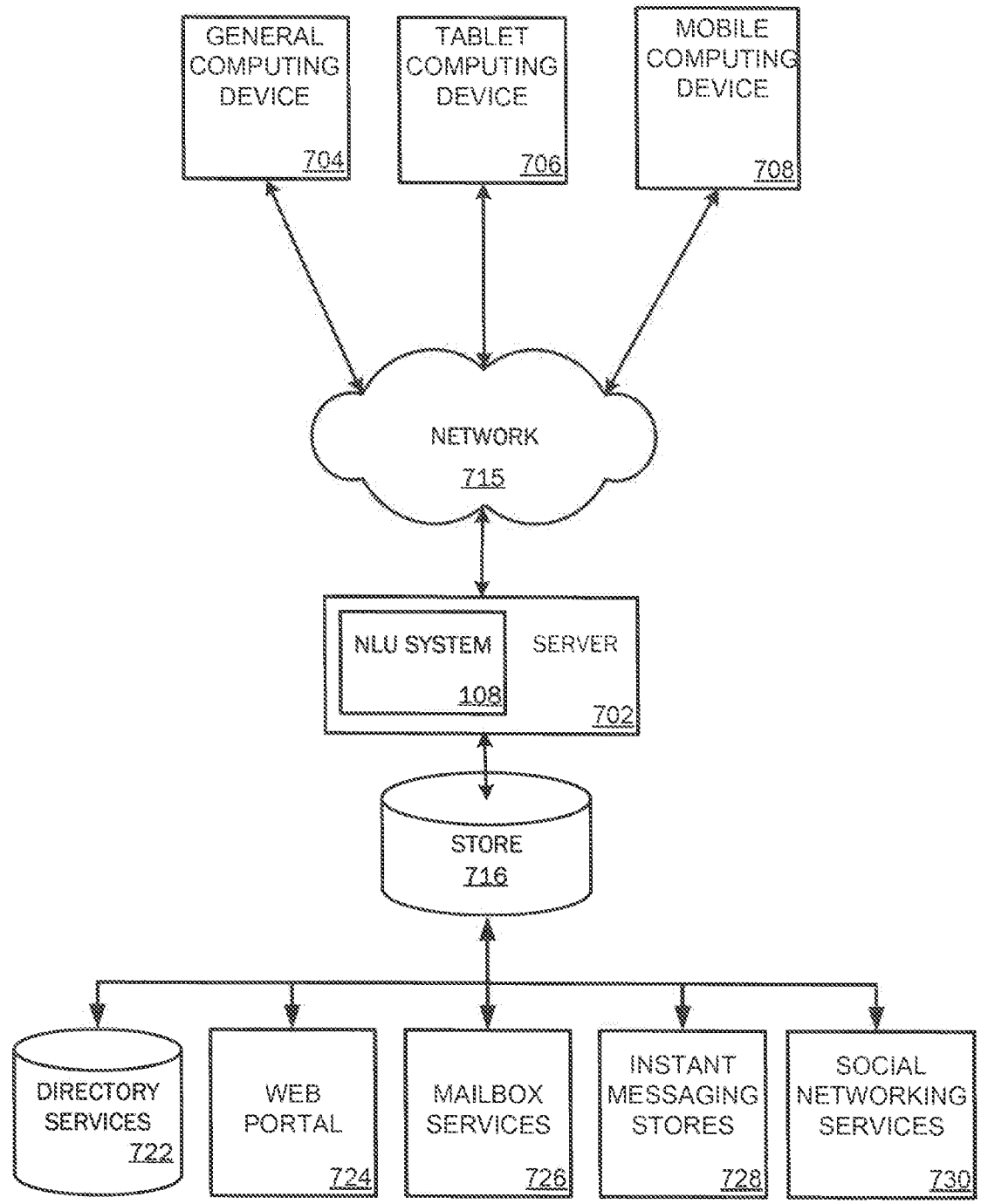
FIG. 7 is a simplified block diagram of a distributed computing system in which aspects of the present disclosure may be practiced.

FIG. 7 illustrates one aspect of the architecture of a system for processing data received at a computing system from a remote source, such as a general computing device 704, tablet 706, or mobile device 708, as described above. Content displayed at server device 702 may be stored in different communication channels or other storage types (e.g., store 716). For example, various documents may be stored using a directory service 722, a web portal 724, a mailbox service 726, an instant messaging store 728, or a social networking site 730. By way of example, a NLU system 108 may be implemented in a general computing device 704, a tablet computing device 706 and/or a mobile computing device 708 (e.g., a smart phone). In other aspects, the server 702 is configured to implement NLU system 108, via the network 715.

Figure 8:
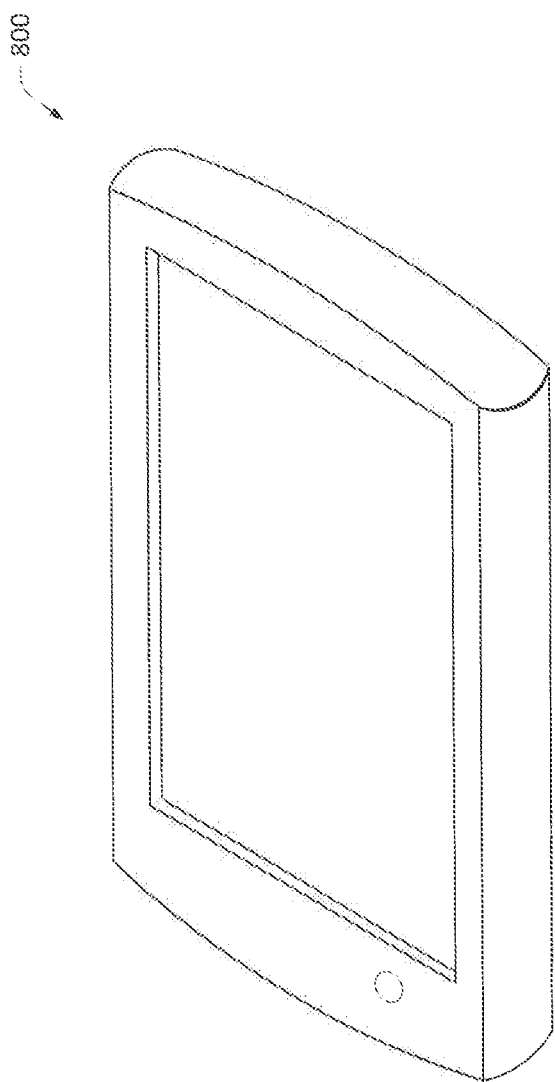
FIG. 8 illustrates a tablet computing device with which aspects of the present disclosure may be practiced.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include keystroke entry, touch screen entry, voice or other audio entry, gesture entry where an associated computing device is equipped with detection (e.g., camera) functionality for capturing and interpreting user gestures for controlling the functionality of the computing device, and the like.

EXAMPLES

The Examples provided herein are exemplary and are not meant to be limiting.

Example 1

Figure 3A:
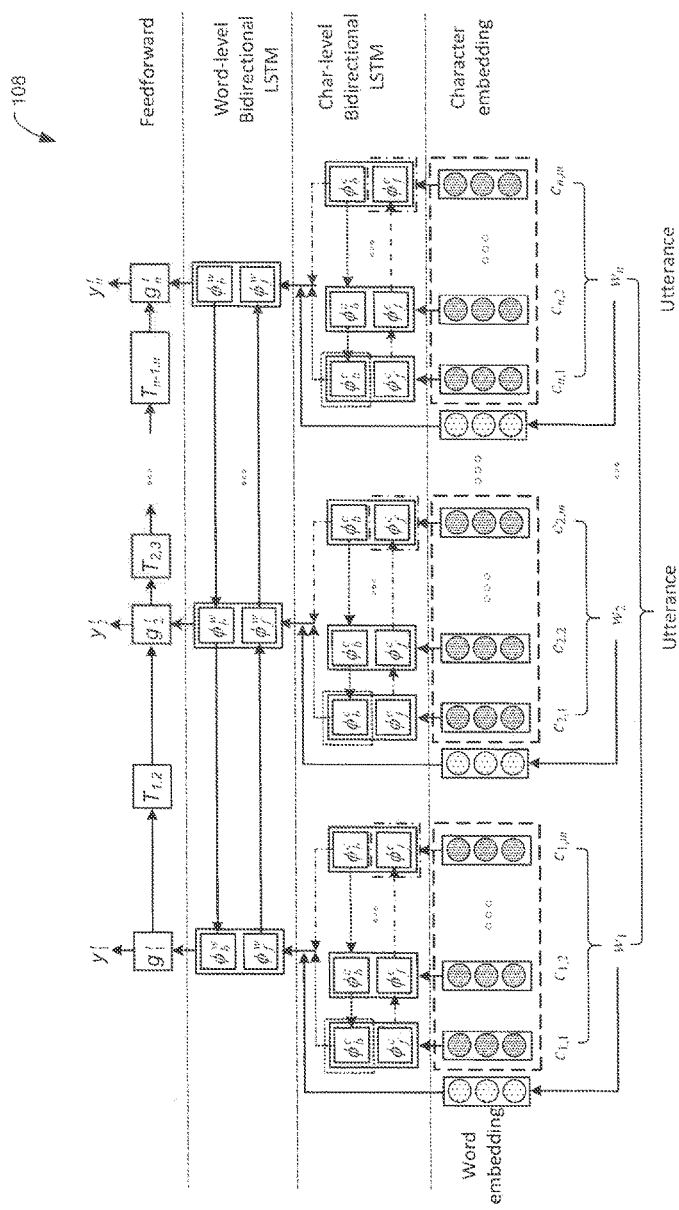
FIG. 3A is schematic diagram illustrating an example of a network architecture for an example learning model, in accordance with aspects of the disclosure.

Example 1 provides an example of the architecture utilized for a learning model of a domain expert. The learning model utilizes a LSTM (long short-term memory) simply as a mapping $\varphi: R^d \times R^{d'} \to R^{d'}$ that takes an input vector x and a state vector h to output a new state vector $h' = \varphi(x, h)$. The LSTM is a recurrent neural network architecture that supports machine learning that allows data to flow both forwards and backwards. At a high level, the individual model consists of builds on several ingredients shown in FIG. 3A: character and word embedding, a bidirectional LSTM (BiLSTM) at a character layer, a BiLSTM at word level, and a feedforward network at the output.

A description of the architecture for this example model is provided below. Let C denote the set of character types and W denote the set of word types. Let $\oplus$ denote the vector concatenation operation. An known architecture for encoding a sentence $(w_1 \ldots w_n) \in W^n$ is given by bidirectional LSTMs (BiLSTMs). This example model first constructs a network over an utterance. The model parameters $\Theta$ associated with this BiLSTM layer are Character embedding $e_c \in \mathbb{R}^{25}$ for each $c \in C$
Character LSTMs $\phi_f^c, \phi_b^c: \mathbb{R}^{25} \times \mathbb{R}^{25} \to \mathbb{R}^{25}$
Word embedding $e_w \in \mathbb{R}^{100}$ for each $w \in W$
Word LSTMs $\phi_f^w, \phi_b^w: \mathbb{R}^{150} \times \mathbb{R}^{100} \to \mathbb{R}^{100}$ Let $w_1 \ldots w_n \in W$ denote a word sequence where word $w_i$ has character $w_i(j) \in C$ at position j. First, the model computes a character-sensitive word representation $v_i \in \mathbb{R}^{150}$ as:

$$f_j^c = \phi_f^c(e_{w_i(j)}, f_{j-1}^c) \forall_j = 1 \ldots |w_i|$$

$$b_j^c = \phi_b^c(e_{w_i(j)}, b_{j+1}^c) \forall_j = |w_i| \ldots 1$$

$$v_i = f_{|w_i|}^c \oplus b_1^c \oplus e_{w_i}$$

for each i=1 ... n. Next, the model computes:

$$f_i^W = \phi_f^W(v_i, f_{i-1}^W) \forall_i = 1 \ldots n$$

$$b_i^W = \phi_b^W(v_i, b_{i+1}^W) \forall_i = n \ldots 1$$

and induces a character- and context-sensitive word representation $h_i \in \mathbb{R}^{200}$ as:

$$h_i = f_i^W \oplus b_i^W \qquad (EQ\ 1)$$

for each i=1 ... n. These vectors can be used to perform intent classification or slot tagging on the utterance.

The following paragraph describes how the above example model performs intent classification or prediction. The intent of the utterance is predicted utilizing $(h_1 \ldots h_n) \in \mathbb{R}^{200}$ in Equation #1 as follows. Let I denote the set of intent types. A single-layer feedforward network $g^i: \mathbb{R}^{200} \to \mathbb{R}^{|I|}$ is introduced, whose parameters are denoted by $\Theta^i$. The |I|-dimension vector is computed by:

$$\mu^i = g\left(\sum_{i=1}^{n} h_i\right)$$

and the conditional probability of the correct intent τ is defined as:

$$p(\tau | h_1 \ldots h_n) \alpha \exp(\mu_\tau^i) \qquad (EQ\ \#2)$$

The intent classification loss is given by the negative log likelihood:

$$L^i(\theta, \theta^i) = -\Sigma_l \log p(\tau^{(l)} | h^{(l)}) \qquad (EQ\ \#3)$$

where l iterates over intent-annotated utterances.

The following paragraph describes how the above example model performs slot tagging. The semantic slots of the utterance are predicted using $h_1 \ldots h_n \in \mathbb{R}^{200}$ in Equation #1 as follows. Let S denote the set of semantic types and L the set of corresponding BIO label types, such as to/O, San/B-Source. Francisco/I-Source, and airport/O, that is, L={B-ϵ:e∈ε}∪∪{I-ϵ:e∈ε}∪{O}. A transition matrix T∈ $\mathbb{R}^{|L|\times|L|}$ is added and a single layer feedforward network $g^l$: $\mathbb{R}^{200} \to \mathbb{R}^{|L|}$ is added to the network; denote these additional parameters $\Theta^t$. The conditional random field (CRF) tagging layer defines a joint distribution over label sequences of $y_1 \ldots y_n \in L$ of $w_1 \ldots w_n$ as:

$$p(y_1 \ldots y_n | h_1 \ldots h_n)$$

$$\alpha \exp(\Sigma_{i=1}^n T_{y_{i-1}, y_i} \times g_{y_i}^t(h_i)) \quad \text{(EQ \#4)}$$

The tagging loss is given by the negative log likelihood:

$$L^t(\theta, \theta^t) = -\Sigma_l \log p(y^{(l)} | h^{(l)}) \quad \text{(EQ \#5)}$$

Where l iterate over tagged sentence in the data. Alternatively, the local loss can be optimized by:

$$L^{t-loc}(\theta, \theta^t) = -\Sigma_l \Sigma_i \log p(y_i^{(l)} | h_i^{(l)}) \quad \text{(EQ \#6)}$$

where $p(y_i|h_i) \propto \exp(g_{y_i}^t(h_i))$.

It is assumed that each of the domains (K) on the NLU system utilize the model described above and illustrated in FIG. 3A. Each domain includes a domain expert denoted by $\Theta^{(1)} \ldots \Theta^{(K)}$. The model for adding a new domain K+1 to the NLU system is described below and is referred to herein as a domain expert model.

Figure 3B:
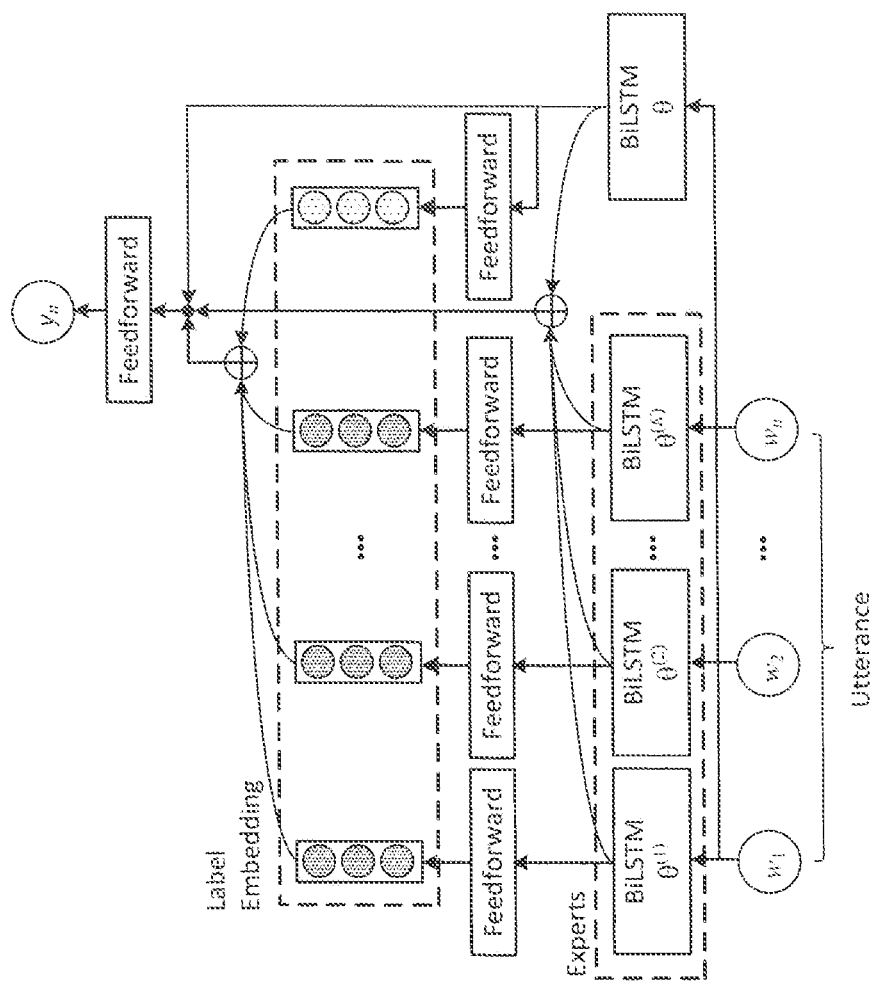
FIG. 3B is schematic diagram illustrating an example of a network architecture for a domain expert training model for the learning model shown in FIG. 3A, in accordance with aspects of the disclosure.

FIG. 3B illustrates a schematic diagram of an example of the network architecture for a domain expert model. The network architecture for the domain expert model includes three components: (1) K domain experts+1 target BiLSTM layer to induce a feature representation; (2) K domain experts+1 target feedforward layer to output pre-trained label embedding; and (3) a final feedforward layer to output an intent or slot. Additionally, the domain expert model may utilize two different or separate attention mechanisms to combine feedback from domain experts.

Given an utterance $w_1, \ldots, w_n$, the domain expert model uses a BiLSTM layer to induce a feature representation $h_1, \ldots, h_n$, as specified in Equation #1. The domain expert model further involves K domain experts $\Theta^{(1)}, \ldots, \Theta^{(K)}$ on this utterance to obtain the feature representations for $h_1^{(k)}, \ldots, h_n^{(k)}$ for $k=1, \ldots, K$. For each word $w_i$, the model computes an attention weight for each domain $k=1, \ldots, K$ domain as:

$$q_{i,k}^{dot} = h_i^\tau h^{(k)} \quad \text{(EQ \#7)}$$

in the simplest case. The bilinear function is modified as shown below:

$$q_{i,k}^{bi} = h_i^\tau B h^{(k)} \quad \text{(EQ \#8)}$$

Where B is an additional model parameter, and also the feedforward function is:

$$q_{i,k}^{feed} = W \tanh(U h_i^\tau + V h^{(k)} + b^1) + b^2 \quad \text{(EQ \#9)}$$

where U, V, W, $b^1$, $b^2$ are additional model parameters. The final attention weights $a^{(1)} \ldots a^{(1)}$ are obtained by using a softmax layer as shown below:

$$a_{i,k} = \frac{\exp(q_{i,k})}{\sum_{k=1}^{K} \exp(q_{i,k})} \quad \text{(EQ \#10)}$$

The weighted combination of the experts' feedback is given by:

$$h_i^{experts} = \Sigma_{k=1}^K a_{i,k} h_i^{(k)} \quad \text{(EQ \#11)}$$

and the model makes a prediction by using $\bar{h}_l \ldots \bar{h}_n$ where:

$$\bar{h}_i = h_i \oplus h_i^{experts} \quad \text{(EQ \#12)}$$

These vectors replace the original feature vectors $h_i$ in defining the intent or tagging losses.

There are two different variants of the domain expert model that may be utilized, such as label embedding and selective attention.

Label Embedding

In addition to the state vectors $h^{(1)} \ldots h^{(K)}$ produced by K experts, the domain attention mode may further incorporate pre-trained label embeddings. Specifically, this model assumes pre-trained vectors $e^y$ for all labels y. Importantly, these vectors are trained on all domains. For each expert k, first the most likely label $y^{(k)}$ is predicted and the attention weight is computed as:

$$q_{i,k}^{-dot} = h^1 e^{y^{(k)}} \quad \text{(EQ \#13)}$$

where h is a sentence vector or word vector depending on the task. The linear combination shown below:

$$\bar{a}_{i,k} = \frac{\exp(\bar{q}_{i,k})}{\sum_{k=1}^{K} \exp(\bar{q}_{i,k})} e_i^{label} = \sum_{k=1}^{K} \bar{a}_{i,k} e_i^{y^{(k)}} \quad \text{(EQ \#14)}$$

is used in conjunction with $\bar{h}$.

Selective Attention

Instead of computing attention over all K experts, this model only considers the top $K^t \leq K$ that predict the highest label scores. As such this model computes attention over these $K^t$ vectors. Various values of $K^t$ may be utilized for this model.

Example 2

Several experiments were performed to evaluate the domain expert model. For example, to test the effectiveness of the domain expert model, the domain expert model was applied to a suite of seven personal assistant domains with 2 separate tasks in spoken language understanding: (1) intent classification and (2) slot (label) tagging. The intent classification task is a multi-class classification problem with the goal of determining to which one of the |I| intents a user utterance belongs within a given domain. The slot tagging task is a sequence labeling problem with the goal of identifying entities and chunking of useful information snippets in a user utterance. For example, a user could say "reserve a table at joeys grill for Thursday at seven pm for five people". Then the goal of the first task would be to classify this utterance as "make reservation" intent given the places domain, and the goal of the second task would be to tag "joeys grill" as restaurant, "Thursday" as date, "seven pm" as time, and "five" as number of people.

The short descriptions on the seven test domains are shown in Table 1, as listed below, shows the test domains have different granularity and diverse semantics.

TABLE 1

| Description of test domains. | | | |
|---|---|---|---|
| Domain | Intent | Slot | Description |
| EVENTS | 6 | 18 | Buy event tickets |
| FITNESS | 7 | 13 | Track health |
| M-TICKET | 7 | 26 | Buy movie tickets |
| ORDER PIZZA | 1 | 51 | Order Pizza |
| REMINDER | 3 | 28 | Remind task |

TABLE 1-continued

Description of test domains.

| Domain | Intent | Slot | Description |
|---|---|---|---|
| TAXI | 5 | 22 | Find book a cab |
| TV | 3 | 5 | Control TV |

For each personal assistant test domain, we only used 1000 training utterances to simulate scarcity of newly labeled data. The amount of development and test utterances was 100 and 10,000 respectively.

In testing the domain attention mode, a domain adaptation (DA) scenario was considered, where a target domain has limited training data and the source domain has a sufficient amount of labeled data. We farther consider a scenario, creating a new virtual domain targeting a specific scenario given a large inventory of intent and slot types and underlying models built for many different applications and scenarios. One typical use case is that of building natural language capability through intent and slot modeling (without actually building a domain classifier) targeting a specific application. Therefore, the experimental settings utilized herein are rather different from previously considered settings for domain adaptation in two aspects:

Multiple source domains: In most previous works, only a pair of domains (source vs. target) has been considered, although the pair can be easily generalized to K>2. Here, an experiment with K=25 domains was utilized.

Variant output: In a typical setting for domain adaptation, the label space is invariant across all domains. Here, the label space can be different in different domains, which is a more challenging setting.

For this domain attention scenario, it was tested whether the domain expert model approach can effectively make a system to quickly generalize to a new domain with limited supervision given 25 existing domain experts as shown in Equation number 2.

Table 2, shown below, provides an overview of the 25 different domain experts utilized for this experiment.

TABLE 2

Domain Experts Overview

| Category | Domain | Example |
|---|---|---|
| Transportation | 4 | Bus, Flight |
| Time | 4 | Alarm, Calendar |
| Media | 5 | Movie, Music |
| Action | 5 | Home, Auto, Phone |
| Location | 3 | Hotel, Business |
| Information | 4 | Weather, Health |
| Total | 25 | |

The categorizations provided in Table 2 are solely for the purposes of describing domains because of the limited space and they are completely unrelated to the model. The number of sentences or utterances in each domain is in the range of 50.000 to 660,000 and the number of unique intents and slots are 200 and 500 respectively. As such, in total, the experiment utilized 25 domain-specific expert models. For the average performance, intent accuracy is 98% and slot F1 score is 96%.

In summary, the domain expert model is tested with seven personal assistant test domains across two tasks of intent classification and slot tagging. All models tested use the same underlying model architecture as described above in FIG. 1 of Example 1. The baseline models are listed below:

TARGET, a model trained on a targeted domain without DA techniques.

UNION: a model trained on the union of all K+1 domains.

DA: a neural domain adaptation method which trains domain specific K LSTMs with a generic LSTM on all domain training data (also referred to herein as a global training model).

All models below are based on attending an ensemble of 25 domain experts (DE) described in Table 2, where a specific set of intent and slots models is trained for each domain. Two feedbacks from domain experts may be utilized: (1) feature representation from LSTM; and (2) label embedding from feedforward described in FIGS. 1 and 2 in Example 1, respectively.

$DE^B$: DE without domain attention mechanism. The $DE^B$ uses the unweighted combination of first feedbacks from experts like bag-of-word model.

$DE^1$: DE with domain attention with the weighted combination of the first feedbacks from experts.

$DE^2$: $DE^1$ with additional weighted combination of second feedbacks.

$DE^2$: $DE^2$ with selected attention mechanism, described in FIG. 2 of Example 1 (also referred to herein as the domain expert model).

In these experiments, all the models were implemented using DyNet and were trained using Stochastic Gradient Descent (SGD) with Adam—an adaptive learning rate algorithm. The initial learning rate of $4 \times 10^{-4}$ was utilized and left all the other hyper parameters as suggested. Each SGD update was computed without a minibatch with INTEL® MKL. The experiments also used the dropout regularization with the keep probability of 0.4.

To encode user utterances, bidirectional LSTMs (BiLSTMs) at the character level and the word level were utilized, along with 25 dimensional character embedding and 100 dimensional word embedding. The dimensions of both the input and output of the character LSTMs were 25, and the dimensions of the input and output of the word LSTMs were 150 and 100, respectively. The dimensions of the input and output of the final feedforward network for intent and slot were 200 and the number of their corresponding tasks. Its activation was rectified linear unit (ReLU).

To initialize word embedding, word embedding trained from known methods were used. In the following sections, intent classification results in accuracy percentage and slot results in F1-score are reported. To compute slot F1-score, the standard CoNLL evaluation script is utilized.

The DA setting results are shown for the 25 source domains as shown in Table 2, but only 1000 labeled data (training data) provided in the target domain. The performance of the baselines and the DE variants are shown in Table 3 below.

TABLE 3

Intent classification accuracy (%) and slot tagging F1-score (%).

| Task | Domain | Target | Union | DA | $DE_B$ | $DE_1$ | $DE_2$ | $DE_{S2}$ |
|---|---|---|---|---|---|---|---|---|
| Intent | Events | 88.3 | 78.5 | 89.9 | 93.1 | 92.5 | 92.7 | 94.5 |
| | Fitness | 88.0 | 77.7 | 92.0 | 92.0 | 91.2 | 91.8 | 94.0 |
| | M-Ticket | 88.2 | 79.2 | 91.9 | 94.4 | 91.5 | 92.7 | 93.4 |
| | OrderPizza | 85.8 | 76.6 | 87.8 | 89.3 | 89.4 | 90.8 | 92.8 |
| | Reminder | 87.2 | 76.3 | 91.2 | 90.0 | 90.5 | 90.2 | 93.1 |
| | Taxi | 87.3 | 76.8 | 89.3 | 89.9 | 89.6 | 89.2 | 93.7 |

TABLE 3-continued

Intent classification accuracy (%) and slot tagging F1-score (%).

| Task | Domain | Target | Union | DA | $DE_B$ | $DE_1$ | $DE_2$ | $DE_{S2}$ |
|---|---|---|---|---|---|---|---|---|
| | TV | 88.9 | 76.4 | 90.3 | 81.5 | 91.5 | 92.0 | 94.0 |
| | Average | 87.7 | 77.4 | 90.3 | 90.5 | 90.9 | 91.4 | 93.6 |
| Slot | Events | 84.8 | 76.1 | 87.1 | 87.4 | 88.1 | 89.4 | 90.2 |
| | Fitness | 84.0 | 75.6 | 86.4 | 86.3 | 87.0 | 88.1 | 88.9 |
| | M-Ticket | 84.2 | 75.6 | 86.4 | 86.1 | 86.8 | 88.4 | 89.7 |
| | OrderPizza | 82.3 | 73.6 | 84.2 | 84.4 | 85.0 | 86.3 | 87.1 |
| | Reminder | 83.5 | 75.0 | 85.9 | 86.3 | 87.0 | 88.3 | 89.2 |
| | Taxi | 83.0 | 74.6 | 85.6 | 85.5 | 86.3 | 87.5 | 88.6 |
| | TV | 85.4 | 76.7 | 87.7 | 87.6 | 88.3 | 89.3 | 90.1 |
| | Average | 83.9 | 75.3 | 86.2 | 86.2 | 86.9 | 88.2 | 89.1 |

The top half of the table shows the results of intent classification and the results of slot tagging are in the bottom half. The baseline which trained only on the target domain (TARGET) shows a reasonably good performance, yielding on average 87.7% on the intent classification and 83.9% F1-score on the slot tagging. Simply training a single model with aggregated utterances across all domains (UNION) brings the performance down to 77.4% and 75.3%. Using the DA approach shows a significant increase in performance in all seven domains, yielding on average 90.3% intent accuracy and 86.2%.

The DE without domain attention ($DE^B$) shows similar performance compared to DA. Using DE model with domain attention ($DE^1$) shows another increase in performance, yielding on average 90.9% intent accuracy and 86.9%. The performance increases again when both feature representation and label embedding ($DE^2$) were utilized, yielding on average 91.4% and 88.2% and observe nearly 93.6% and 89.1% when using selective attention ($DES^2$). Note that $DE^{S2}$ selects the appropriate number of experts per layer by evaluation on a development set. The bolded numbers in TABLE 2 indicate the best performing methods.

The results show that variant approach ($DE^{S2}$) achieves a significant performance gain in all seven test domains, yielding average error reductions of 47.97% for intent classification and 32.30% for slot tagging. The results suggest that NLU system 108 and method 400 as described above can quickly generalize to a new domain with limited supervision given K existing domains by having only a handful more data of 1k newly labeled data points. The poor performance of using the union of both source and target domain data might be due to the relatively very small size of the target domain data, overwhelmed by the data in the source domain. For example, a word such as "home" can be labeled as place type under the TAXI domain, but in the source domains can be labeled as either home screen under the PHONE domain or contact name under the CALENDAR domain.

Example 3

Figure 9:
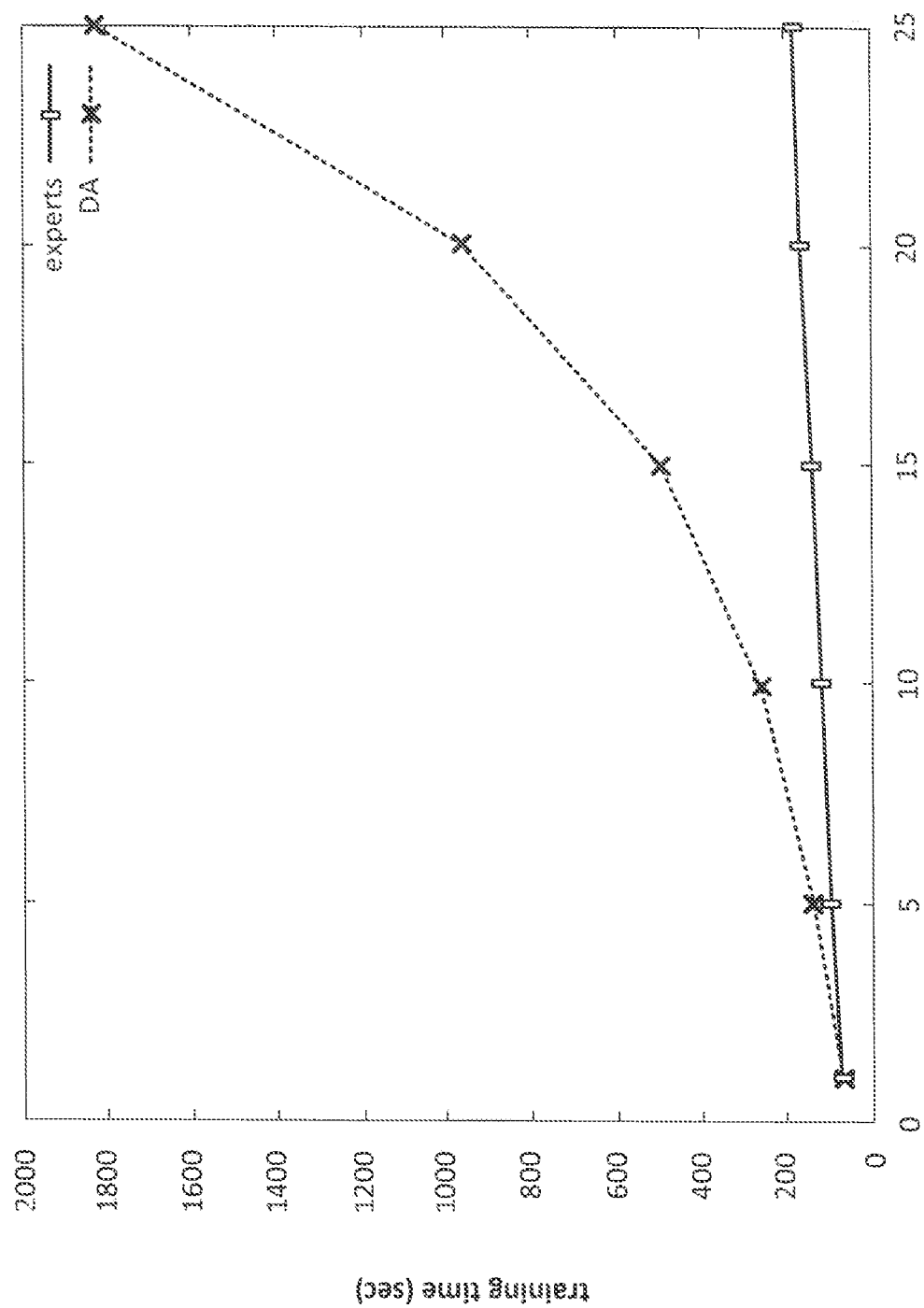
FIG. 9 is a graph illustrating a comparison of training time between a domain expert model and a global union (DA) model.

FIG. 9 illustrates a graph that shows the time required for training $DE^{S2}$ and DA models as described above in EXAMPLE 2. The horizontal axis in FIG. 9 is the number of domains and the vertical axis is training time per epoch in seconds. Here the target domain utilized was CALENDAR, which has 1,000 utterances of training data. The training time for $DE^{S2}$ stays almost constant as the number of source domains increases. However, the training time for DA grows exponentially in the number of source domains. Specifically, when trained with one source or expert domain, both took around a minute per epoch on average. When training with full 25 source domains, $DE^{S2}$ took three minutes per epoch while DA took 30 minutes per epoch. Since the DA models need to iterate over all 25+1 domains to retrain the global model, the net training time ratio could be over 250.

Example 4

Figure 10:
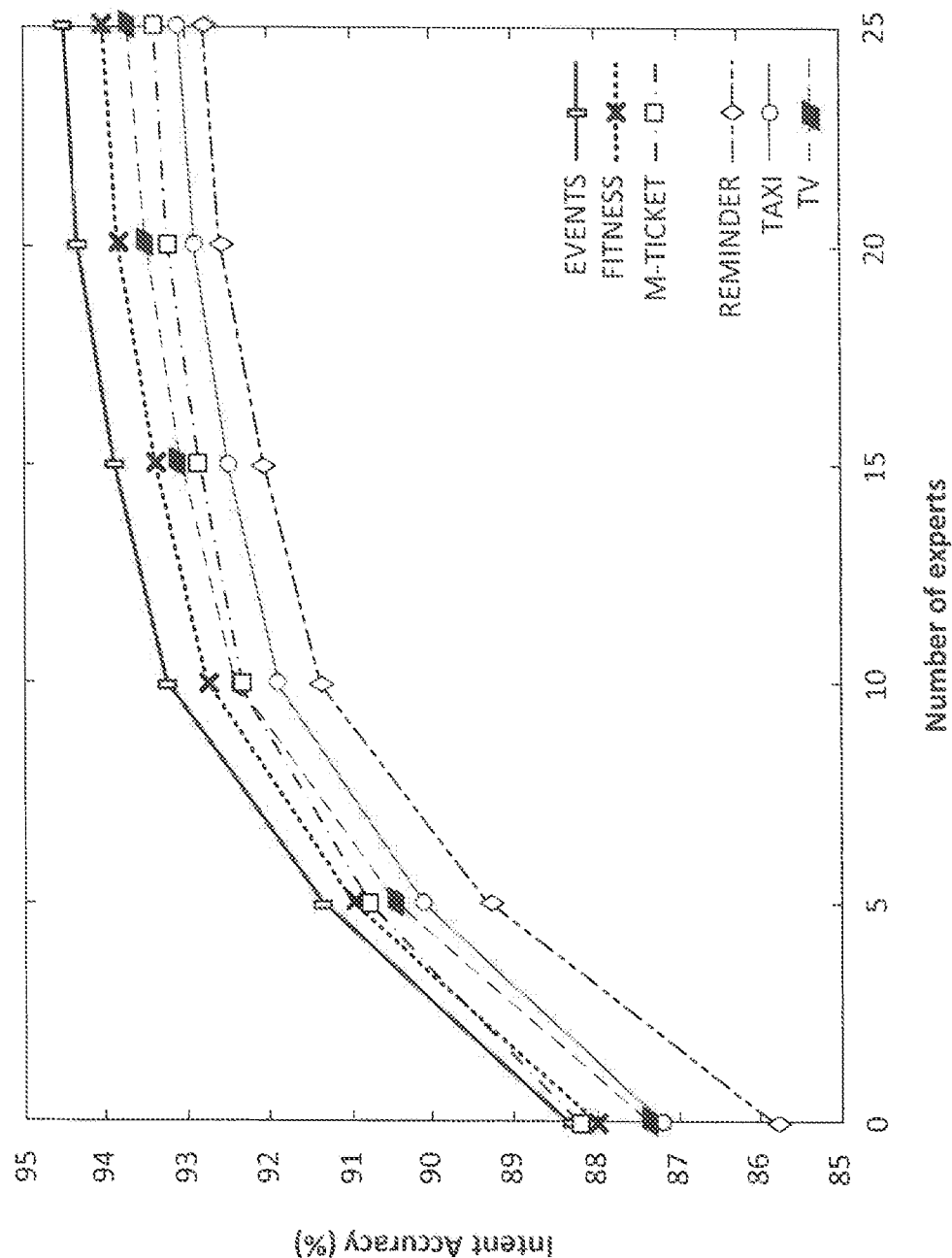
FIG. 10 is a graph illustrating the learning curves of different domains as the number of domain experts increase in a domain expert model.

The performance of the models as a function of the number of domain experts was also measured for $DE^{S2}$. FIG. 10 is a graph illustrating the resulting learning curves for each test domain. The overall trend is clear: as the more expert domains are added, the more the test performance improves for $DE^{S2}$ model. With ten or more expert domains added, the $DE^{S2}$ model starts to get saturated achieving more than 90% in accuracy across all seven domains.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some aspects of the present technology with reference to the accompanying drawings, in which only some of the possible aspects were described. Other aspects can, however, be embodied in many different forms and the specific aspects disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various aspects disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A natural language understanding (NLU) system, the NLU system comprising:
    at least one processor; and
    memory encoding computer executable instructions that, when executed by the at least one processor, perform a method comprising:
        receiving a new domain for the NLU system;
        receiving limited training data for the new domain;
        training the new domain based on the limited training data to form a partially trained new domain expert;
        sending queries that are generated by the partially trained new domain expert to existing domain experts, wherein the queries are based on the limited training data;
        receiving answers from each existing domain expert in response to the queries;
        assigning a weight to each of the answers from the existing domain experts to form weighted answers; and training the partially trained new domain expert based on the weighted answers to form a new domain expert.

2. The NLU system of claim 1, wherein the limited training data comprise at most 1,000 utterances.

3. The NLU system of claim 1, wherein the existing domain experts include at least 25 different existing domain experts.

4. The NLU system of claim 1, wherein the queries request intent prediction, slot prediction, and label prediction.

5. The NLU system of claim 1, wherein the assigning of the weight to each of the answers from the existing domain experts is based on a semantic closeness of the partially trained new domain expert.

6. A method for adding a new domain to a natural language understanding (NLU) system, the method comprising:
receiving the new domain for the NLU system;
receiving training data for the new domain;
training a domain expert associated with the new domain based on the training data to form a partially trained new domain expert;
sending a first query to existing domain experts in the NLU system, the first query generated by the partially trained new domain expert;
receiving answers from the existing domain experts in the NLU system in response to the first query;
assigning a weight to each of the answers to form weighted answers, the weights generated by the partially trained new domain expert; and
training the partially trained new domain expert based on the weighted answers to form a new domain expert.

7. The method of claim 6, wherein the training data comprise at most 10,000 utterances.

8. The method of claim 6, wherein the existing domain experts include at least seven different existing domain experts.

9. The method of claim 6, wherein a label space between at least two of the domain experts differs.

10. The method of claim 6, wherein the first query requests intent prediction and slot prediction of a first utterance.

11. The method of claim 6, wherein the first query requests intent prediction, slot prediction, and label prediction of a first utterance.

12. The method of claim 6, further comprising:
sending a second query to the existing domain experts in the NLU system, the second query generated by the new domain expert; and
receiving answers from the existing domain experts in response to the second query.

13. The method of claim 12, wherein:
the first query requests intent prediction and slot prediction of a first utterance; and
the second query requests intent prediction and slot prediction of a second utterance.

14. The method of claim 6, wherein the assigning of the weight to each of the answers is based on a comparison of an answer to the first query by the partially trained new domain expert.

15. The method of claim 6, wherein the assigning of the weight to each of the answers is based on a semantic closeness between the partially trained new domain expert and a respective existing domain expert.

16. The method of claim 6, wherein the action is performed by a client computing device and the client computing device is at least one of:
a mobile telephone;
a smart phone;
a tablet;
a smart watch;
a wearable computer;
a personal computer;
a desktop computer;
a gaming system; or
a laptop computer.

17. The method of claim 6, wherein the NLU system is part of an application and the application is at least one of:
a digital assistant application;
a voice recognition application;
an email application;
a social networking application;
a collaboration application;
an enterprise management application;
a messaging application;
a word processing application;
a spreadsheet application;
a database application;
a presentation application;
a contacts application;
a gaming application;
an e-commerce application;
an e-business application;
a transactional application;
an exchange application; or
a calendaring application.

18. The method of claim 6, further comprising:
receiving a user utterance for the new domain expert;
determining an action based on the user utterance with the new domain expert; and
sending instructions to perform the action.

19. A system comprising:
at least one processor; and
a memory encoding computer executable instructions that, when executed by the at least one processor, cause the at least one processor to perform a method for natural language understanding (NLU), the method comprising:
receiving a new domain for a NLU system;
receiving training data for the new domain;
training a domain expert associated with the new domain based on the training data to form a partially trained new domain expert;
sending queries generated by the partially trained new domain expert to existing domain experts in the NLU system;
receiving answers from the existing domain experts in the NLU system in response to the queries;
assigning a weight to each of the answers from the existing domain experts;
selecting a portion of the answers for training based on the weight assigned to each of the answers to form a group of selected answers; and
training the partially trained new domain expert based on the group of selected answers to form a new domain expert.

20. The system of claim 19, wherein selecting the portion of the answers for training based on the weight assigned to each of the answers comprises at least one of:
selecting one or more answers having a weight above a predetermined threshold; or
selecting an answer associated with one or more highest weights.

* * * * *